(12) United States Patent
Dong et al.

(10) Patent No.: US 9,926,401 B2
(45) Date of Patent: Mar. 27, 2018

(54) METHODS FOR MAKING WET GELS AND DRIED GELS THEREFROM

(71) Applicant: Georgia-Pacific Chemicals LLC, Atlanta, GA (US)

(72) Inventors: Xing Dong, Decatur, GA (US); Shahid P. Qureshi, Duluth, GA (US); Christopher M. Lee, Norcross, GA (US); Kelly A. Shoemake, Atlanta, GA (US); Joseph Frank Ludvik, Midlothian, VA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 15/462,414

(22) Filed: Mar. 17, 2017

(65) Prior Publication Data

US 2017/0190826 A1    Jul. 6, 2017

Related U.S. Application Data

(62) Division of application No. 14/489,633, filed on Sep. 18, 2014, now Pat. No. 9,598,525.

(60) Provisional application No. 61/880,199, filed on Sep. 20, 2013.

(51) Int. Cl.

| | |
|---|---|
| *C08G 8/28* | (2006.01) |
| *C08G 8/32* | (2006.01) |
| *C08G 16/02* | (2006.01) |
| *C08G 81/00* | (2006.01) |
| *C01B 32/30* | (2017.01) |

(52) U.S. Cl.
CPC .............. *C08G 8/28* (2013.01); *C01B 32/30* (2017.08); *C08G 8/32* (2013.01); *C08G 16/0225* (2013.01); *C08G 16/0256* (2013.01); *C08G 81/00* (2013.01); *C08J 2201/0504* (2013.01); *C08J 2205/022* (2013.01)

(58) Field of Classification Search
CPC ...... C08G 8/28; C08G 8/32; C08J 9/28; C08J 2361/10; C08J 2300/14; C08J 2205/026; C08J 2205/028
See application file for complete search history.

(56) References Cited

U.S. PATENT DOCUMENTS

| | | | |
|---|---|---|---|
| 2002/0064642 A1* | 5/2002 | Albert | ................... C04B 35/524 428/315.5 |
| 2012/0034442 A1* | 2/2012 | Pauzauskie | ............ B82Y 30/00 428/219 |

OTHER PUBLICATIONS

Pizzi et al., "Completion of Alkaline Cure Acceleration of Phenol-Formaldehyde Resins: Acceleration by Organic Anhydrides," Journal of Applied Polymer Science, vol. 51, 1351-1352 (1994), John Wiley & Sons, Inc. (Year: 1994).*

* cited by examiner

*Primary Examiner* — Kara B Boyle
(74) *Attorney, Agent, or Firm* — Ram W. Sabnis

(57) ABSTRACT

Methods for making wet gels and dried gels therefrom are provided. The method for making a wet gel can include combining a hydroxybenzene compound, an aldehyde compound, and an additive to produce a reaction mixture. The additive can include a carboxylic acid, an anhydride, a homopolymer, a copolymer, or any mixture thereof. At least the hydroxybenzene compound and the aldehyde compound can be reacted to produce a wet gel. The reaction mixture can include about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer, where weight percent values are based on the combined weight of the hydroxybenzene compound, the aldehyde compound, and the additive.

20 Claims, No Drawings

METHODS FOR MAKING WET GELS AND DRIED GELS THEREFROM

CROSS-REFERENCE TO RELATED APPLICATIONS

This application is a divisional of co-pending patent application Ser. No. 14/489,633, filed on Sep. 18, 2014, which claims priority to U.S. Provisional Patent Application No. 61/880,199, filed on Sep. 20, 2013, which are both incorporated by reference herein.

BACKGROUND

Field

Embodiments described generally relate to methods for making wet gels and dried gels therefrom. More particularly, such embodiments relate to methods for making wet gels that can be processed into dried gels and carbon products.

Description of the Related Art

Carbon-containing wet gels and dried gels provided therefrom, such as carbon aerogels, xerogels, and cryogels, have been used in a variety of products to improve properties including, but not limited to, thermal insulation value, electrical conductivity, and energy storage. Methods for synthesizing wet gels and converting the wet gels into aerogels, cryogels, and xerogels are known in the art, and depending on the particular drying method the end product is typically referred to as an aerogel, a cryogel, or a xerogel. One particular composition can include, for example, resorcinol and formaldehyde (a "monomer component" or "sol," which is a solution or a colloidal dispersion of particles in a liquid) for producing precursor solutions that can be further processed into a large monolithic polymer gel or "sol-gel."

For many applications, aerogels (which are dried gels) having pores with diameters between about 2 nm and 50 nm (mesoporous) or larger, are the preferred end product. The monolithic polymer gels, however, are difficult and expensive to convert into an aerogel. For example, supercritical drying, the drying process typically used to make aerogels, requires specialized equipment and is time consuming and expensive.

There is a need, therefore, for improved methods for making wet gels that can be processed to produce dried gels and carbon products.

SUMMARY

Methods for making wet gels and dried gels and carbon products therefrom are provided. In at least one specific embodiment, a method for making a wet gel, can include combining a hydroxybenzene compound, an aldehyde compound, and an additive to produce a reaction mixture. The additive can include a carboxylic acid, an anhydride, a homopolymer, a copolymer, or any mixture thereof. The method can also include reacting at least the hydroxybenzene compound and the aldehyde compound to produce a wet gel. The reaction mixture can include about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer. The reaction mixture can include about 10 wt % to about 90 wt % of the additive, where all weight percent values are based on the combined weight of the hydroxybenzene compound, the aldehyde compound, and the additive.

In at least one specific embodiment, a method for making a dried gel can include combining a solvent, a hydroxybenzene compound, an aldehyde compound, and an additive to produce a reaction mixture. The additive can include a carboxylic acid, an anhydride, a homopolymer, a copolymer, or any mixture thereof. At least the hydroxybenzene compound and the aldehyde compound can be reacted to produce a wet gel. The method can also include drying the wet gel to produce a dried gel. A pressure exerted on the wet gel during drying can be maintained below a critical pressure of the solvent. The dried gel can have an average pore size of about 10 nm to about 150 nm, a specific surface area of about 5 $m^2/g$ to about 1,500 $m^2/g$, a pore volume of about 0.2 $cm^3/g$ to about 2.5 $cm^3/g$, or any combination thereof.

In at least one other specific embodiment, the method for making a dried gel, can include determining one or more desired properties of a dried gel. The one or more desired properties can include an average pore size of about 10 nm to about 150 nm, a specific surface area of about 5 $m^2/g$ to about 1,500 $m^2/g$, a pore volume of about 0.2 $cm^3/g$ to about 2.5 $cm^3/g$, or any combination thereof. The method can also include combining a solvent, a hydroxybenzene compound, an aldehyde compound, and an additive to produce a reaction mixture. The additive can include a carboxylic acid, an anhydride, a homopolymer, a copolymer, or any mixture thereof. At least the hydroxybenzene compound and the aldehyde compound can be reacted to produce a wet gel. The method can also include drying the wet gel to produce a dried gel. A pressure exerted on the wet gel during drying can be maintained below a critical pressure of the solvent. At least one of the amount of the hydroxybenzene compound, the amount of the aldehyde compound, and the amount of the additive can be controlled to produce the dried gel having the one or more desired properties.

DETAILED DESCRIPTION

A wet gel can be formed by reacting or polymerizing a reactant or reaction mixture that can include, but is not limited to, at least one hydroxybenzene compound, at least one aldehyde compound, and at least one additive. The additive can include, but is not limited to, at least one carboxylic acid, at least one anhydride, at least one homopolymer, at least one copolymer, or any mixture thereof. The wet gel can also be formed by reacting or polymerizing a reaction mixture that can include, but is not limited to, a prepolymer and the additive. The prepolymer can be formed by reacting the at least one hydroxybenzene compound and the at least one aldehyde compound. The prepolymer can further polymerize in the presence of the additive such that the additive does not react and/or does react to form part of the polymer forming the wet gel. As such, the polymer can be free from the at least one additive. Said another way, the polymer can be composed of only the reaction product between the at least one hydroxybenzene compound and the at least one aldehyde compound. The reaction mixture can also include, but is not limited to, the hydroxybenzene compound, the aldehyde compound, the prepolymer, and the additive.

As used herein, the term "wet gel" refers to a wet (aqueous or non-aqueous based) network of polymer chains that have one or more pores or voids therein and a liquid at least partially occupying or filling the one or more pores or voids. If the liquid that at least partially occupies or fills the voids is water, the polymer particles can be referred to as a "hydrogel." As used herein, the term prepolymer refers to the reaction product formed by reacting at least the hydroxybenzene compound and the aldehyde compound with one another so long as the resulting product remains in liquid form at room temperature (e.g., about 25° C.).

The reaction mixture can also include, but is not limited to, at least one solvent and/or at least one catalyst. Any one or more of the components of the reaction mixture can be reactive or non-reactive. For example, the hydroxybenzene compound and the aldehyde compound can react with one another to form a polymer. In another example, the solvent can be non-reactive with any of the other components of the reaction mixture.

The wet gel, such as polymer particles in gel form or a monolithic polymer structure in gel form, can be produced by polymerizing the reaction mixture in a solution, dispersion, suspension, and/or emulsion process. The reaction or polymerization of the reaction mixture can proceed via a sol gel-type process to produce the wet gel. The sol gel process is a process that can be used to produce wet gels in a monolithic form. The sol gel process is discussed and described in, for example, U.S. Pat. Nos. 4,873,218; 4,997,804; 5,124,364; and 5,556,892. The reaction or polymerization of the reaction mixture can proceed via step-growth polymerization, e.g., condensation polymerization, addition polymerization, or a combination of step-growth and addition polymerization. The reaction or polymerization of the reaction mixture and/or the formation of the prepolymer can be carried out in one or more solvents or liquid mediums.

As used herein, the term "solvent" refers to a substance that dissolves or suspends the reactants and provides a medium in which a reaction may occur. Suitable solvents can include, but are not limited to, water, one or more alcohols, one or more alkanes, one or more ketones, one or more aromatic hydrocarbons, or any mixture thereof. Illustrative alcohols can include, but are not limited to, methanol, ethanol, propanol, t-butanol, or any mixture thereof. Illustrative alkanes can include, but are not limited to, hexane, heptane, octane, nonane, decane, and the like, isomers thereof, or any mixture thereof. Illustrative ketones can include, but are not limited to, acetone, benzophenone, acetophenone, 2,2-dimethyl-1,3-cyclopentanedione, or any mixture thereof. Other suitable solvents can include, but are not limited to, tetrahydrofuran, benzene, toluene, xylene, ethylbenzene, cumene, mesitylene, or any mixture thereof. The liquid that at least partially occupies or fills the pores or voids of the wet gel can be or include the solvent. The liquid that at least partially occupies or fills the pores or voids of the wet gel can also include one or more of the reactants in the reaction mixture (the hydroxybenzene compound, the aldehyde compound, and the additive, e.g., the carboxylic acid, the anhydride, the homopolymer, the copolymer, and/or the catalyst). In at least one embodiment, the intentional addition of a solvent can be avoided. Additionally, if the solvent is not added to the reaction mixture, if the hydroxybenzene compound and the aldehyde compound react with one another via a condensation reaction, the water generated from the condensation reaction can become or serve as a solvent or liquid that can at least partially occupy or fill the pores or voids of the wet gel.

The reaction or polymerization of the reaction mixture can proceed via a suspension or dispersion polymerization process to produce the wet gel. As used herein, the terms "suspension process," "suspension polymerization process," "dispersion process," and "dispersion polymerization process" are used interchangeably and refer to a heterogeneous reaction process that uses mechanical agitation to mix the reaction mixture in the solvent or "continuous phase" fluid such as a hydrocarbon and/or water, where the reaction mixture phase and the solvent or continuous phase fluid are not miscible. The reaction mixture can be suspended or dispersed in the solvent or continuous phase as droplets, where the reactants (at least the hydroxybenzene compound and the aldehyde compound) can undergo reaction to form particles of polymer and/or curing to form cured particles of polymer. As used herein, the term "curing" refers to the toughening or hardening of polymers via an increased degree of cross-linking of polymer chains. Cross-linking refers to the structural and/or morphological change that occurs in the pre-polymer and/or polymer, such as by covalent chemical reaction, ionic interaction or clustering, phase transformation or inversion, and/or hydrogen bonding.

The reaction or polymerization of the reaction mixture can proceed via an emulsion polymerization process to produce the wet gel. As used herein, the terms "emulsion process" and "emulsion polymerization process" refer to both "normal" emulsions and "inverse" emulsions. Emulsions differ from suspensions in one or more aspects. One difference is that an emulsion will usually include the use of a surfactant that creates or forms the emulsions (very small size droplets). When the carrier or continuous phase fluid is a hydrophilic fluid, such as water, and the reaction mixture phase is a hydrophobic compound(s), normal emulsions, such as oil-in-water, form, where droplets of monomers are emulsified with the aid of a surfactant in the carrier or continuous phase fluid. Monomers react in these small size droplets. These droplets are typically small in size as the particles are stopped from coagulating with each other because each particle is surrounded by the surfactant and the charge on the surfactant electrostatically repels other particles. Whereas suspension polymerization usually creates much larger particles than those made with emulsion polymerization. When the carrier or continuous phase fluid is a hydrophobic fluid such as oil and the reaction mixture phase is hydrophilic compounds, inverse-emulsions, such as water-in-oil, form.

Illustrative suspension and emulsion polymerization processes suitable for preparing the wet gel can include those discussed and described in U.S. Patent Application Publication Nos.: 2013/0211005 and 2014/0148560 and U.S. Provisional Patent Application having Ser. No. 61/731,113, filed on Nov. 29, 2012.

In one or more embodiments, the preparation of the wet gel particles can be controlled such that two or more populations of particle size distributions can be produced. For example, introduction of an aqueous phase to an organic phase can be staged. As such, the final wet gel particle distribution can include one or two or more nodes, where the ratio between the highest and lowest node can be about 1,000 or lower, about 500 or lower, about 200 or lower, about 100 or lower, about 50 or lower, about 25 or lower, about 10 or lower, 5 or lower, or about 2 or lower. For example, the ratio between the highest node and the lowest node can be about 0.1, about 0.5, about 1, about 2, about 3, about 5, about 7, or about 10 to about 30, about 60, about 90, about 125, about 150, about 250, about 400, about 600, about 700, about 800, about 900, or about 950.

The hydroxybenzene compound and the aldehyde compound can be pre-polymerized at a temperature from a low of about 20° C., about 25° C., about 30° C., about 35° C., or about 40° C. to a high of about 50° C., about 55° C., about 60° C., about 65° C., about 70° C., about 75° C., about 80° C., about 85° C., about 90° C., about 95° C., about 100° C., 150° C., about 200° C., about 250° C., or about 300° C. In one or more embodiments, the hydroxybenzene compound and the aldehyde compound can be pre-polymerized under pressure and the temperature during the prepolymerization can be up to the boiling point of the reaction mixture. For example, the hydroxybenzene compound and the aldehyde compound can be pre-polymerized at a temperature of about 30° C. to about 95° C., about 60° C. to about 90° C., about 75° C. to about 95° C., or about 50° C. to about 90° C. In another example, the hydroxybenzene compound and the aldehyde compound can be pre-polymerized at a temperature of about 40° C., about 50° C., about 60° C., about 70° C., about 75° C., about 80° C., about 85° C., about 90° C., or about 95° C. The prepolymer can be mixed, blended, stirred, or otherwise combined with at least one of and the additive, with or without the solvent and/or catalyst.

If the prepolymer is formed by reacting the hydroxybenzene compound with the aldehyde compound, the extent or amount the compounds react to form the prepolymer can be based on one or more properties. Illustrative properties of the reaction product or prepolymer that can be used to monitor the extent of reaction can include, but are not limited to, viscosity, water concentration, refractive index, the unreacted or free concentration of the aldehyde compound, molecular weight, or any combination thereof.

If the prepolymer is formed, the hydroxybenzene compound and the aldehyde compound can be reacted with one another until the prepolymer has a viscosity from a low of about 0.5 cP, about 1 cP, about 2 cP, about 10 cP, or about 50 cP to a high of about 100 cP, about 500 cP, about 1,000 cP, about 2,500 cP, about 5,000 cP, or about 10,000 cP at a temperature of 25° C. For example, the hydroxybenzene and aldehyde can be reacted with one another until the prepolymer has a viscosity of about 1 cP to about 800 cP, about 5 cP to about 500 cP, about 75 cP to about 400 cP, about 125 cP to about 1,100 cP, or about 150 cP to about 300 cP at a temperature of 25° C. The viscosity of the reaction mixture or prepolymer or other liquids can be determined using a Brookfield Viscometer at a temperature of 25° C. For example, the Brookfield Viscometer can be equipped with a small sample adapter such a 10 mL adapter and the appropriate spindle to maximize torque such as a spindle no. 31.

If the prepolymer is formed, the hydroxybenzene compound and the aldehyde compound can be reacted with one another until the prepolymer has a water concentration from a low of about 0.5 wt %, about 1 wt %, about 2 wt %, or about 3 wt % to a high of about 50 wt %, about 60 wt %, about 70 wt %, or about 80 wt %, based on the weight of the prepolymer, any unreacted hydroxybenzene compound, any unreacted aldehyde compound, and water. For example, the prepolymer can be produced by reacting phenol and formaldehyde, and the formaldehyde combined with the phenol can be a 50 wt % aqueous solution. As such, the water concentration can be based on water produced or generated during formation of the prepolymer and/or water added to the mixture of phenol and formaldehyde, water present with the hydroxybenzene compound, and/or water present with the aldehyde compound. The hydroxybenzene compound and the aldehyde compound can be reacted with one another to produce the prepolymer with the reaction reduced or stopped and/or the carboxylic acid, the anhydride, the homopolymer, and/or the copolymer added thereto when the prepolymer has a water concentration from about 5 wt % to about 50 wt %, about 1 wt % to about 25 wt %, about 10 wt % to about 40 wt %, about 12 wt % to about 20 wt %, or about 15 wt % to about 35 wt %, based on the weight of the prepolymer, any unreacted hydroxybenzene compound, any unreacted aldehyde compound, and water.

If the prepolymer is formed, the hydroxybenzene compound and the aldehyde compound can be reacted to an endpoint based on the refractive index of the liquid prepolymer. For example, the prepolymer can be polymerized until the prepolymer has a refractive index from a low of about 1.1000, about 1.2000, about 1.3000, or about 1.3200 to a high of about 1.4500, about 1.4800, about 1.5000, about 1.5500, about 1.6000, about 1.6500, about 1.7000, about 1.7500, or about 1.8000. In another example, the polymerization of the monomer mixture to produce the prepolymer can be carried out to a refractive index of about 1.3500 to about 1.4500, about 1.3800 to about 1.4400, about 1.3900 to about 1.4350, about 1.3900 to about 1.4500, about 1.1000 to about 1.7000, about 1.3000 to about 1.6000, about 1.4200 to about 1.5500, about 1.4800 to about 1.6400, or about 1.3700 to about 1.4300.

If the prepolymer is formed, the hydroxybenzene compound and the aldehyde compound can be reacted with one another to an endpoint based on the unreacted or free concentration of the aldehyde compound. For example, the prepolymer can be polymerized until the reaction mixture has no free aldehyde compound remaining or an unreacted or free concentration of the aldehyde compound from a low of about 0.5 wt %, about 1 wt %, about 3 wt %, or about 5 wt % to a high of about 10 wt %, about 15 wt %, about 20 wt %, or about 25 wt %. In another example, the prepolymer can be polymerized until the reaction mixture has an unreacted or free concentration of the aldehyde compound of about 2 wt % to about 17 wt %, about 1 wt % to about 5 wt %, about 4 wt % to about 12 wt %, or about 6 wt % to about 18 wt %.

If the prepolymer is formed, the hydroxybenzene compound and the aldehyde compound can be reacted with one another to an endpoint based on the molecular weight of the prepolymer. For example, the prepolymer can be polymerized until the prepolymer has a weight average molecular weight from a low of about 100, about 300, about 500, or about 800 to a high of about 1,000, about 5,000, about 10,000, or about 20,000. In another example, the prepolymer can be polymerized until the prepolymer has a weight average molecular weight of about 200 to about 1,200, about 400 to about 900, about 600 to about 2,500, about 1,000 to about 6,000, about 3,000 to about 12,000, or about 7,000 to about 16,000.

In one or more embodiments, the reaction mixture can be agitated. For example, the reaction mixture can be agitated to improve and/or maintain a homogeneous or substantially homogenous distribution of the reactants in the solvent or a homogeneous or substantially homogenous distribution of the solvent in the reaction mixture. In one or more embodiments, the reaction mixture is not agitated. The components of the reaction mixture can be combined within one or more mixers. The mixer can be or include any device, system, or combination of device(s) and/or system(s) capable of batch, intermittent, and/or continuous mixing, blending, contacting, or the otherwise combining of two or more components. Illustrative mixers can include, but are not limited to, mechanical mixer agitation, ejectors, static mixers, mechanical/power mixers, shear mixers, sonic mixers, vibration mixing, movement of the mixer itself, or any combination thereof. The mixer can include one or more heating jackets, heating coils, internal heating elements, cooling jackets, cooling coils, internal cooling elements, or the like, to regulate the temperature therein. The mixer can be an open vessel or a closed vessel. The components of the reaction mixture can be combined within the mixer under a vacuum, at atmospheric pressure, or at pressures greater than atmospheric pressure.

Depending, at least in part, on the temperature at which reaction between the components of the reaction mixture is carried out; the reactants can react and/or cure in a time ranging from about 30 seconds to several days. For example, the reaction mixture can be reacted and/or cured in a time ranging from a low of about 1 minute, about 2 minutes, about 3 minutes, about 4 minutes, about 5 minutes, about 10 minutes, about 15 minutes, or about 20 minutes to a high of about 40 minutes, about 1 hour, about 1.5 hours, about 2 hours, about 3 hours, about 4 hours, about 5 hours, about 10 hours, about 15 hours, about 20 hours, about 1 day, about 2 days, about 3 days, about 4 days, about 5 days, about 6 days, or more to produce the wet gel. The reaction mixture can be reacted and/or cured at a temperature from a low of about 25° C., about 35° C., about 45° C., about 55° C., or about 65° C. to a high of about 85° C., about 100° C., about 125° C., about 150° C., about 175° C., about 200° C., about 225° C., about 250° C., about 275° C., or about 300° C. The pressure of the reaction mixture during reaction can be from a vacuum to greater than atmospheric pressure. For example, the pressure of the reaction mixture during reaction can be from a low of about 50 kPa, about 75 kPa, about 100 kPa, or atmospheric pressure to a high of about 200 kPa, about 500 kPa, about 5,000 kPa, about 10,000 kPa, or about 50,000 kPa.

The reaction between at least the hydroxybenzene compound and the aldehyde compound and/or the prepolymer in the presence of the additive can be carried out in one continuous reaction step or two or more reaction steps. One example of a multi-step reaction process can include heating the reactants to a first temperature for a first period of time in the reaction vessel to produce a first or intermediate product. The intermediate product can then be heated or cooled to a second temperature for a second period of time to produce the wet gel product. The second temperature can be greater than the first temperature or less than the first temperature. The second period of time can be greater than the first period of time or less than the first period of time. Another example of a multi-step reaction process can include heating the reactants to a first temperature for a first period of time in the reaction vessel to produce a first or intermediate product. The intermediate product can be heated to a second temperature for a second period of time to produce a second intermediate product. The second intermediate product can then be heated to a third temperature for a third period of time to produce the wet gel. The third temperature can be greater than the second temperature or less than the second temperature. The third temperature can be greater than the first temperature or less than the first temperature. If the reaction mixture is heated within a sealed reaction vessel during the production of the wet gel, the pressure within the-reaction vessel may increase during heating of the reaction mixture. The wet gel can be made in a reaction vessel that remains open (not sealed), closed (sealed), or the reaction vessel can be open for some of the time and closed for some of the time. The pressure of the reaction mixture, the first intermediate product, and/or the second intermediate product can be anywhere from less than atmospheric pressure to greater than atmospheric pressure.

In at least one specific example, the hydroxybenzene compound and the aldehyde compound and/or the prepolymer formed therefrom and the additive can be combined in the reaction vessel to form a reaction mixture and the reaction mixture can be heated to a first temperature for a first period of time to produce a first intermediate product. The one or more catalyst and/or solvents can also be added to the reaction vessel and be present in the reaction mixture. The first temperature can be from a low of about 25° C., about 30° C., about 35° C., about 40° C., about 45° C., about 50° C., or about 60° C. to a high of about 80° C., about 90° C., about 95° C., about 100° C. or more. The first period of time can be from a low of about 30 minutes, about 1 hour, about 1.5 hours, about 2 hours, or about 3 hours to a high of about 6 hours, about 12 hours, about 18 hours, about 1 day, about 2 days, about 3 days, or more than about 3 days. The first intermediate product can then heated to a second temperature for a second period of time to produce a second intermediate product. The second temperature can be from a low of about 25° C., about 30° C., about 35° C., about 40° C., about 45° C., about 50° C., or about 60° C. to a high of about 80° C., about 90° C., about 95° C., about 100° C. or more. The second period of time can be from a low of about 30 minutes, about 1 hour, about 1.5 hours, about 2 hours, or about 3 hours to a high of about 6 hours, about 12 hours, about 18 hours, about 1 day, about 2 days, about 3 days, or more than 3 days. The second intermediate product can be heated to a third temperature for a third period of time to produce the wet gel. The third temperature can be from a low of about 25° C., about 30° C., about 35° C., about 40° C., about 45° C., about 50° C., or about 60° C. to a high of about 80° C., about 90° C., about 95° C., about 100° C. or more. The third period of time can be from a low of about 30 minutes, about 1 hour, about 1.5 hours, about 2 hours, or about 3 hours to a high of about 6 hours, about 12 hours, about 18 hours, about 1 day, about 2 days, or about 3 days.

If the solvent is present in the reaction mixture, the temperature of the reaction mixture, the first intermediate product, the second intermediate product, and/or any other intermediate products formed before arriving at the wet gel product can be maintained at a temperature below the boiling point of the solvent. If the solvent is present in the reaction mixture, the temperature of the reaction mixture, the first intermediate product, the second intermediate product, and/or any other intermediate products formed before arriving at the wet gel product can be increased above the boiling point of the solvent during heating of any one or more of the reaction mixture, the first intermediate product, the second intermediate product, and/or any other intermediate products.

The reaction between the components of the reaction mixture, e.g., at least the hydroxybenzene compound and the aldehyde compound, can be carried out under a wide range of pH values. For example, the reaction between the components of the reaction mixture can be carried out at a pH of a low of about 1, about 2, or about 3 to a high of about 7, about 8, about 9, about 10, about 11, or about 12. In one or more embodiments, the reaction can be carried out under acidic conditions. For example, the pH of the reaction mixture can be less than 7, less than 6.5, less than 6, less than 5.5, less than 5, less than 4.5, or less than 4. In another example, the pH of the reaction mixture can range from about 1 to about 6.5, about 1.5 to about 5.5, about 2 to about 5, about 1.5 to about 4.5, about 1 to about 4, about 2 to about 4, about 1 to about 3.5, or about 2 to about 4.5.

The molar ratio of the hydroxybenzene compound to the aldehyde compound can be from a low of about 0.1:1, about 0.3:1, about 0.5:1, about 0.7:1, or about 1:1 to a high of about 1.5:1, about 1.7:1, or about 2:1. For example, the molar ratio of the one or more hydroxybenzene compound to the aldehyde compounds can be from about 0.1:1 to about 1.8:1, about 0.2:1 to about 1.4:1, about 0.8:1 to about 1.3:1, about 0.2:1 to about 0.9:1, about 0.3:1 to about 0.8:1, about 0.4:1 to about 0.8:1, about 0.4:1 to about 0.7:1, or about 0.4:1 to about 0.6:1. In at least one example, the molar ratio of the hydroxybenzene compound to the aldehyde compound can be about 0.4:1, about 0.5:1, about 0.6:1, about 0.7:1, about 0.8:1, about 0.9:1, about 1:1, about 1.1:1, about 1.2:1, about 1.3:1, about 1.4:1, or about 1.5:1.

If the catalyst is present, the molar ratio of the hydroxybenzene compound to the catalyst can be from a low of about 2:1, about 3:1, about 4:1, about 5:1, about 6:1, or about 7:1 to a high of about 50:1, about 100:1, about 200:1, about 500:1, or about 1,000:1. For example, the molar ratio of the hydroxybenzene compound to catalyst can be from about 2:1 to about 1,000:1, about 3:1 to about 800:1, a about 4:1 to about 700:1, about 5:1 to about 300:1, about 2:1 to about 50:1, about 1:1 to about 20:1, about 10:1 to about 30:1, about 20:1 to about 40:1, or about 30:1 to about 50:1. In another example, the molar ratio of the hydroxybenzene compound can be at least 2:1, at least 3:1, at least 4:1, at least 5:1, at least 10:1, at least 15:1, at least 25:1, at least 40:1, at least 55:1, at least 60:1, at least 65:1, at least 70:1, or at least 75:1 and less than 1,000:1, less than 500:1, less than 200:1, or less than 100:1.

The reaction mixture can include from a low of about 5 wt %, about 10 wt %, about 15 wt %, about 20 wt %, about 25 wt %, or about 30 wt % to a high of about 45 wt %, about 50 wt %, about 55 wt %, about 60 wt %, about 65 wt %, or about 70 wt % of the hydroxybenzene compound, based on the combined weight of the hydroxybenzene compound, the aldehyde compound, and the additive. For example, the reaction mixture can include about 10 wt % to about 50 wt %, about 15 wt % to about 45 wt %, about 17 wt % to about 40 wt %, or about 20 wt % to about 35 wt % of the hydroxybenzene compound, based on the combined weight of the hydroxybenzene compound, the aldehyde compound, and the additive. In another example, the reaction mixture can include at least 12 wt %, at least 15 wt %, at least 17 wt %, or at least 20 wt % to about 35 wt %, about 40 wt %, about 45 wt %, or about 50 wt % of the hydroxybenzene compound, based on the combined weight of the hydroxybenzene compound, the aldehyde compound, and the additive.

The reaction mixture can include from a low of about 3 wt %, about 5 wt %, about 7 wt %, about 9 wt %, or about 10 wt % to a high of about 11 wt %, about 12 wt %, about 14 wt %, about 16 wt %, about 18 wt %, about 20 wt %, about 22 wt %, about 25 wt %, or about 30 wt % of the aldehyde compound, based on the combined weight of the hydroxybenzene compound, the aldehyde compound, and the additive. For example, the reaction mixture can include about 6 wt % to about 22 wt %, about 7 wt % to about 18 wt %, about 8 wt % to about 17 wt %, or about 9 wt % to about 16 wt % of the aldehyde compound, based on the combined weight of the hydroxybenzene compound, the aldehyde compound, and the additive. In another example, the reaction mixture can include at least 5 wt %, at least 6 wt %, at least 7 wt %, or at least 8 wt % to about 14 wt %, about 16 wt %, about 18 wt %, or about 20 wt % of the aldehyde compound, based on the combined weight of the hydroxybenzene compound, the aldehyde compound, and the additive.

The reaction mixture can include from low of about 0.1 wt %, about 1 wt %, about 3 wt %, about 5 wt %, about 7 wt %, about 10 wt %, about 12 wt %, or about 15 wt % to a high of about 40 wt %, about 50 wt %, about 60 wt %, about 70 wt %, about 80 wt %, or about 85 wt % of the carboxylic acid, based on the combined weight of the hydroxybenzene compound, the aldehyde compound, and the additive. For example, the reaction mixture an include about 10 wt % to about 75 wt %, about 20 wt % to about 45 wt %, about 35 wt % to about 65 wt %, about 50 wt % to about 70 wt %, about 25 wt % to about 35 wt %, about 30 wt % to about 45 wt %, or about 55 wt % to about 65 wt % of the carboxylic acid, based on the combined weight of the hydroxybenzene compound, the aldehyde compound, and the additive. In another example, the reaction mixture can include at least 20 wt %, at least 25 wt %, at least 30 wt %, or at least 35 wt % to about 60 wt %, about 65 wt %, about 70 wt %, or about 75 wt % of the carboxylic acid, based on the combined weight of the hydroxybenzene compound, the aldehyde compound, and the additive.

The reaction mixture can include from a low of about 0.1 wt %, about 1 wt %, about 3 wt %, about 5 wt %, about 7 wt %, about 10 wt %, about 12 wt %, or about 15 wt % to a high of about 20 wt %, about 25 wt %, about 30 wt %, about 35 wt %, or about 40 wt % of the anhydride, based on the combined weight of the hydroxybenzene compound, the aldehyde compound, and the additive. For example, reaction mixture can include about 0.5 wt % to about 6 wt %, about 1 wt % to about 5 wt %, about 1.5 wt % to about 3 wt %, about 5 wt % to about 15 wt %, about 10 wt % to about 25 wt %, about 20 wt % to about 40 wt %, about 10 wt % to about 35 wt %, or about 1 wt % to about 8 wt % of the anhydride, based on the combined weight of the hydroxybenzene compound, the aldehyde compound, and the additive. In another example, the reaction mixture can include at least 0.5 wt %, at least 1 wt %, at least 1.5 wt %, or at least 2 wt % to about 5 wt %, about 10 wt %, about 20 wt %, or about 30 wt % of the anhydride, based on the combined weight of the hydroxybenzene compound, the aldehyde compound, and the additive.

The reaction mixture can include from a low of about 0.1 wt %, about 1 wt %, about 3 wt %, about 5 wt %, about 7 wt %, about 10 wt %, about 12 wt %, or about 15 wt % to a high of about 20 wt %, about 25 wt %, about 30 wt %, about 35 wt %, or about 40 wt % of the homopolymer, based on the combined weight of the hydroxybenzene compound, the aldehyde compound, and the additive. For example, the reaction mixture can include about 0.5 wt % to about 6 wt %, about 1 wt % to about 5 wt %, about 1.5 wt % to about 3 wt %, about 5 wt % to about 15 wt %, about 10 wt % to about 25 wt %, about 20 wt % to about 40 wt %, about 10 wt % to about 35 wt %, or about 1 wt % to about 8 wt % of the homopolymer, based on the combined weight of the hydroxybenzene compound, the aldehyde compound, and the additive. In another example, the reaction mixture can include at least 0.5 wt %, at least 1 wt %, at least 1.5 wt %, or at least 2 wt % to about 5 wt %, about 10 wt %, about 20 wt %, or about 30 wt % of the homopolymer, based on the combined weight of the hydroxybenzene compound, the aldehyde compound, and the additive.

The reaction mixture can include from a low of about 0.1 wt %, about 1 wt %, about 3 wt %, about 5 wt %, about 7 wt %, about 10 wt %, about 12 wt %, or about 15 wt % to a high of about 20 wt %, about 25 wt %, about 30 wt %, about 35 wt %, or about 40 wt % of the copolymer, based on the combined weight of the hydroxybenzene compound, the aldehyde compound, and the additive. For example, the reaction mixture can include about 0.5 wt % to about 6 wt %, about 1 wt % to about 5 wt %, about 1.5 wt % to about 3 wt %, about 5 wt % to about 15 wt %, about 10 wt % to about 25 wt %, about 20 wt % to about 40 wt %, about 10 wt % to about 35 wt %, or about 1 wt % to about 8 wt % of the copolymer, based on the combined weight of the hydroxybenzene compound, the aldehyde compound, and the additive. In another example, the reaction mixture can include at least 0.5 wt %, at least 1 wt %, at least 1.5 wt %, or at least 2 wt % to about 5 wt %, about 10 wt %, about 20 wt %, or about 30 wt % of the copolymer, based on the combined weight of the hydroxybenzene compound, the aldehyde compound, and the additive.

The reaction mixture can include from a low of about 1 wt %, about 3 wt %, about 5 wt %, about 8 wt %, about 10 wt %, about 15 wt %, about 20 wt %, about 30 wt %, or about 35 wt % to a high of about 50 wt %, about 60 wt %, about 70 wt %, about 80 wt %, or about 90 wt % of the additive, based on the combined weight of the hydroxybenzene compound, the aldehyde compound, and the additive. Said another way, the total amount of the additive (the combined amount(s) of carboxylic acid, anhydride, homopolymer, and copolymer) can be from a low of about 1 wt %, about 3 wt %, about 5 wt %, about 8 wt %, about 10 wt %, about 15 wt %, about 20 wt %, about 30 wt %, or about 35 wt % to a high of about 50 wt %, about 60 wt %, about 70 wt %, about 80 wt %, or about 90 wt % of the additive, based on the combined weight of the hydroxybenzene compound, the aldehyde compound, and the additive(s). For example, the reaction mixture can include about 50 wt % to about 80 wt %, about 60 wt % to about 75 wt %, about 2 wt % to about 30 wt %, about 15 wt % to about 50 wt %, about 20 wt % to about 45 wt %, about 35 wt % to about 65 wt %, about 55 wt % to about 75 wt %, about 70 wt % to about 85 wt %, or about 30 wt % to about 45 wt % of the additive, based on the combined weight of the hydroxybenzene compound, the aldehyde compound, and the additive. In another example, the reaction mixture can include at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, or at least 60 wt % to about 65 wt %, about 70 wt %, about 75 wt %, about 80 wt %, or about 90 wt % of the additive, based on the combined weight of the hydroxybenzene compound, the aldehyde compound, and the additive.

In one or more embodiments, the reaction mixture can include the additive in an amount from a low of about 10 wt %, about 15 wt %, about 20 wt %, about 25 wt %, about 30 wt %, about 35 wt %, about 40 wt %, about 45 wt %, about 50 wt %, about 55 wt %, or about 60 wt % to a high of about 65 wt %, about 70 wt %, about 75 wt %, about 80 wt %, or about 90 wt %, where the reaction mixture includes up to about 65 wt %, up to about 70 wt %, up to about 75 wt %, or up to about 85 wt % of the carboxylic acid, up to about 25 wt %, up to about 30 wt %, up to about 35 wt %, or up to about 40 wt % of the anhydride, up to about 25 wt %, up to about 30 wt %, up to about 35 wt %, or up to about 40 wt % of the homopolymer, and up to about 25 wt %, up to about 30 wt %, up to about 35 wt %, or up to about 40 wt % of the copolymer, where all weight percent values are based on the combined weight of the hydroxybenzene compound, the aldehyde compound, and the additive. For example, the reaction mixture can include up to about 85 wt % of the carboxylic acid, up to about 40 wt % of the anhydride, up to about 40 wt % of the homopolymer, and up to about 40 wt % of the copolymer, where the reaction mixture includes about 10 wt % to about 90 wt % of the additive, where all weight percent values are based on the combined weight of the hydroxybenzene compound, the aldehyde compound, and the additive. In another example, the reaction mixture can include the additive in an amount of about 10 wt %, about 15 wt %, about 20 wt %, about 25 wt %, about 30 wt %, about 35 wt %, about 40 wt %, about 45 wt %, about 50 wt %, about 55 wt %, or about 60 wt % to about 65 wt %, about 70 wt %, about 75 wt %, about 80 wt %, or about 90 wt %; the carboxylic acid in an amount of 85 wt % or less, 75 wt % or less, 70 wt % or less, or 60 wt % or less; the anhydride in an amount of 40 wt % or less, 35 wt % or less, 30 wt % or less, or 25 wt % or less; the homopolymer in an amount of 40 wt % or less, 35 wt % or less, 30 wt % or less, or 25 wt % or less; and the copolymer in an amount of 40 wt % or less, 35 wt % or less, 30 wt % or less, or 25 wt % or less, where all weight percent values are based on the combined weight of the hydroxybenzene compound, the aldehyde compound, and the additive.

The reaction mixture can include from a low of about 1 wt %, about 5 wt %, about 10 wt %, about 15 wt %, about 20 wt %, about 25 wt %, about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt % of the solvent, based on the combined weight of the hydroxybenzene compound, the aldehyde compound, the solvent, the catalyst, and the additive. For example, the reaction mixture can include about 1 wt % to about 95 wt %, about 5 wt % to about 90 wt %, about 10 wt % to about 85 wt %, or about 15 wt % to about 75 wt % of the solvent, based on the combined weight of the hydroxybenzene compound, the aldehyde compound, the solvent, the catalyst, and the additive. In another example, the reaction mixture can include at least 1 wt %, at least 5 wt %, at least 10 wt %, at least 15 wt %, or at least 20 wt % to about 60 wt %, about 65 wt %, about 70 wt %, about 75 wt %, about 80 wt %, about 85 wt %, about 90 wt %, or about 95 wt % of the solvent, based on the combined weight of the hydroxybenzene compound, the aldehyde compound, the solvent, the catalyst, and the additive. In still another example, the reaction mixture can include from a low of about 1 wt %, about 5 wt %, about 10 wt %, about 15 wt %, about 20 wt %, about 25 wt %, about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt % of the solvent, based on the combined weight of the hydroxybenzene compound, the aldehyde compound, the additive, and the solvent.

The hydroxybenzene compound can be or include substituted phenolic compounds, unsubstituted phenolic compounds, or any combination or mixture of substituted and/or unsubstituted phenolic compounds. For example, the hydroxybenzene compound can be or include, but is not limited to, phenol, resorcinol (1,3-dihydroxybenzene), or a combination or mixture thereof. In another example, the hydroxybenzene compound can also be or include any compound or combination of compounds, from which resorcinol or any resorcinol derivative can be derived. In another example, the hydroxybenzene compound can be a monohydroxybenzene, a dihydroxybenzene, a trihydroxybenzene, any other polyhydroxybenzene, or any combination or mixture thereof. In another example, the hydroxybenzene compound can be phenol.

In one or more embodiments, the hydroxybenzene compound can be represented by Formula I:

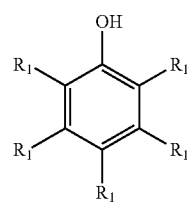

where each $R_1$ can independently be selected from hydrogen, a hydroxy, a C1-C5 alkyl, or OR', where R' can be a C1-C5 alkyl or a C1-C5 aryl. Other suitable hydroxybenzene compounds can be represented by Formula II:

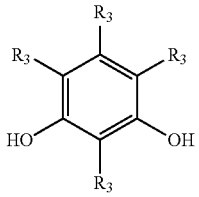
(II)

where each $R_3$ can independently be selected from hydrogen; a hydroxy; a halide such as fluoride, chloride, bromide, or iodide; a nitro; a benzo; a carboxy; an acyl such as formyl, an alkyl-carbonyl such as acetyl, and an arylcarbonyl such as benzoyl; alkyl such as methyl, ethyl, propyl, butyl, pentyl, hexyl, heptyl, octyl, nonyl, decyl, and the like; an alkenyl such as unsubstituted or substituted vinyl and allyl; unsubstituted or substituted methacrylate, unsubstituted or substituted acrylate; silyl ether; siloxanyl; aryl such as phenyl and naphthyl; aralkyl such as benzyl; or alkyaryl such as alkylphenols, and where at least two $R_3$ can be hydrogen.

Other suitable hydroxybenzene compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. In particular, the hydroxybenzene compound can be phenol; resorcinol; catechol; hydroquinone; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; bisphenol A; and bisphenol F; or any combination or mixture thereof. Still other suitable hydroxybenzene compounds can be or include pyrogallol; 5-methylresorcinol; 5-ethylresorcinol; 5-propyl resorcinol; 4-methylresorcinol; 4-ethylresorcinol; 4-propylresorcinol; resorcinol monobenzoate; resorcinol monosinate; resorcinol diphenyl ether; resorcinol monomethyl ether; resorcinol monoacetate; resorcinol dimethyl ether; phloroglucinol; benzoylresorcinol; resorcinol rosinate; alkyl substituted resorcinol; aralkyl substituted resorcinol such as 2-methylresorcinol; phloroglucinol; 1,2,4-benzenetriol; 3,5-dihydroxybenzaldehyde; 2,4-dihydroxybenzaldehyde; 4-ethylresorcinol; 2,5-dimethylresorcinol; 5-methylbenzene-1,2,3-triol, 3,5-dihydroxybenzyl alcohol; 2,4,6-trihydroxytoluene; 4-chlororesorcinol; 2',6'-dihydroxyacetophenone; 2',4'-dihydroxyacetophenone; 3',5'-dihydroxyacetophenone; 2,4,5-trihydroxybenzaldehyde; 2,3,4-trihydroxybenzaldehyde; 2,4,6-trihydroxybenzaldehyde; 3,5-dihydroxybenzoic acid; 2,4-dihydroxybenzoic acid; 2,6-dihydroxybenzoic acid; 1,3-dihydroxynaphthalene; 2',4'-dihydroxypropiophenone; 2',4'-dihydroxy-6'-methylacetophenone; 1-(2,6-dihydroxy-3-methylphenyl)ethanone; 3-methyl 3,5-dihydroxybenzoate; methyl 2,4-dihydroxybenzoate; gallacetophenone; 2,4-dihydroxy-3-methylbenzoic acid; 2,6-dihydroxy-4-methylbenzoic acid; methyl 2,6-dihydroxybenzoate; 2-methyl-4-nitroresorcinol; 2,4,5-trihydroxybenzoic acid; 3,4,5-trihydroxybenzoic acid; 2,3,4-trihydroxybenzoic acid; 2,4,6-trihydroxybenzoic acid; 2-nitrophloroglucinol; or any combination or mixture thereof. Another suitable hydroxybenzene compound can be or include phloroglucinol.

In one or more embodiments, the hydroxybenzene compound can also be or include one or more tannins. As used herein, the term "tannin" refers to both hydrolyzable tannins and condensed tannins. As such, the hydroxybenzene compound can be or include hydrolyzable tannins, condensed tannins, or a combination of hydrolyzable tannins and condensed tannins. Illustrative genera of shrubs and/or trees from which suitable tannins can be derived can include, but are not limited to, *Acacia*, *Castanea*, *Vachellia*, *Senegalia*, *Terminalia*, *Phyllanthus*, *Caesalpinia*, *Quercus*, *Schinopsis*, *Tsuga*, *Rhus*, *Juglans*, *Carya*, and *Pinus*, or any combination or mixture thereof. In another example, genera from which suitable tannins can be derived can include, but are not limited to, *Schinopsis*, *Acacia*, or a combination or mixture thereof. In another example, genera from which suitable tannins can be derived can include, but are not limited to, *Pinus*, *Carya*, or a combination or mixture thereof.

Hydrolyzable tannins are mixtures of simple phenols such as pyrogallol and ellagic acid and of esters of a sugar such as glucose, with gallic and digallic acids. Illustrative hydrolyzable tannins can include, but are not limited to, extracts recovered from *Castanea sativa* (e.g., chestnut), *Terminalia* and *Phyllanthus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., *Radiata* pine, Maritime pine, or bark extract species).

The condensed tannins include about 70 wt % to about 80 wt % active phenolic ingredients (the "tannin fraction") and the remaining ingredients (the "non-tannin fraction") can include, but are not limited to, carbohydrates, hydrocolloid gums, and amino and/or imino acid fractions. The condensed tannins can be used as recovered or extracted from the organic matter and/or the condensed tannins can be purified, e.g., to about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. Illustrative tannins that include the phloroglucinol unit include, but are not limited to, pecan tannins and pine tannins.

Suitable aldehyde compounds can be represented by Formula III:

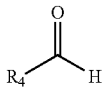

(III)

where $R_4$ can be a hydrogen, an alkyl, an alkenyl, or an alkynyl. The alkyl, alkenyl, or alkynyl can include 1 carbon atom to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination or mixture thereof. One or more other aldehydes, such as glyoxal can be used in place of or in combination with formaldehyde and/or other aldehydes. In at least one example, the aldehyde compound can include formaldehyde, UFC, or a combination or mixture thereof.

The aldehyde compounds can be used as in solid, liquid, and/or gas states. Considering formaldehyde in particular, the formaldehyde can be or include paraformaldehyde (solid, polymerized formaldehyde), formalin solutions (aqueous solutions of formaldehyde, sometimes with methanol, in about 37 wt %, about 44 wt %, or about 50 wt % formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

The aldehyde compound can also be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and can include two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine group, an epoxide group, an aziridine group, an azetidinium group, and/or a hydroxyl group. It should be noted that a multi-functional aldehyde compound having an aldehyde group and a carboxylic acid group could be considered as the aldehyde compound or the carboxylic acid compound, but such a multi-functional aldehyde compound is not intended to satisfy both simultaneously. Said another way, the hydroxybenzene compound, the aldehyde compound, and the carboxylic acid, the anhydride, the homopolymer, and/or the copolymer refer to different compounds with respect to one another.

Suitable bifunctional or difunctional aldehydes that include three (3) or more carbon atoms and have two aldehyde functional groups (—CHO) can be represented by Formula IV:

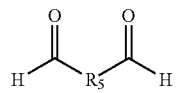

(IV)

where $R_5$ can be an alkenylene, an alkenylene, an alkynyl, a cycloalkenylene, a cycloalkenylene, a cycloalkynyl, or an arylene, having 1 carbon atom to about 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination or mixture thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination or mixture thereof. The aldehyde group in the multifunctional aldehyde compound can exist in other forms, e.g., as a hydrate. As such, any form or derivative of a particular multifunctional aldehyde compound can be used to prepare the wet gels discussed and described herein. The aldehyde compound can include any combination of two or more aldehyde compounds combined with one another and/or added independent of one another to the reaction mixture.

The carboxylic acid can include, but is not limited to, monocarboxylic acids, dicarboxylic acids, tricarboxylic acids, tetracarboxylic acids, pentacarboxylic acids, carboxylic acids having more than five carboxyl groups, polymeric polycarboxylic acids, and any combination or mixture thereof. The monocarboxylic acid can be represented by Formula V:

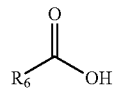

(V)

where $R_6$ can be an alkyl, alkenyl, or alkynyl carbon chain having 1 carbon atom to about 50 carbon atoms. Illustrative monocarboxylic acids can include, but are not limited to, methanoic acid or formic acid, ethanoic acid or acetic acid, propanoic acid, butanoic acid, petanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, hexadecanoic acid, heptadecanoic acid, octadecanoic acid, icosanoic acid, acrylic acid, or any combination or mixture thereof.

The dicarboxylic acid can be represented by Formula VI:

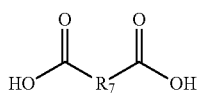

(VI)

where $R_7$ can be an alkylene, alkenylene, or alkynyl carbon chain having 1 carbon atom to about 50 carbon atoms.

The tricarboxylic acid can be represented by Formula VII

(VII)

where $R_8$ can be an alkylene, alkenylene, or an alkynyl carbon chain having 1 carbon atom to about 50 carbon atoms.

The dicarboxylic acids, tricarboxylic acids, tetracarboxylic acids, pentacarboxylic acids, and carboxylic acids having six or more carboxylic acid groups can be referred to collectively as "polycarboxylic acids." Suitable polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like.

Illustrative polycarboxylic acids can include, but are not limited to, citric acid, ethanedioic acid, propanedioic acid, butanedioic acid, petanedioic acid, hexanedioic acid, heptanedioic acid, octanedioic acid, nonanedioic acid, decanedioic acid, undecanedioic acid, dodecanedioic acid, or any combination or mixture thereof. Other illustrative dicarboxylic acids can include, but are not limited to, (Z)-butenedioic acid or maleic acid, (E)-butenedioic acid or fumaric acid, pent-2-enedioic acid or glutaconic acid, dodec-2-enedioic acid or traumatic acid, (2E,4E)-hexa-2,4-dienedioic acid or muconic acid, citric acid, isocitric acid, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, or any combination or mixture thereof.

Suitable polymeric polycarboxylic acids can include organic polymers or oligomers containing more than one pendant carboxyl group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof.

Polymeric polycarboxylic acids can include polyacrylic acid, polymethacrylic acid, polymaleic acid, and the like. Examples of commercially available polyacrylic acids include AQUASET® 529 (Rohm & Haas, Philadelphia, Pa., USA), Criterion 2000 (Kemira, Helsinki, Finland, Europe), NF1 (H. B. Fuller, St. Paul, Minn., USA), and SOKALAN® (BASF, Ludwigshafen, Germany, Europe). With respect to SOKALAN®, this is believed to be a water-soluble polyacrylic copolymer of acrylic acid and maleic acid, having a molecular weight of approximately 4,000. AQUASET® 529 is understood to be a composition containing polyacrylic acid cross-linked with glycerol, also containing sodium hypophosphite as a catalyst. Criterion 2000 is thought to be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The anhydride can be represented by Formula VII:

(VII)

where each $R_9$ and $R_{10}$ can independently be an alkyl, alkenyl, or alkynyl carbon chain, having 1 carbon atom to about 50 carbon atoms. In one or more embodiments, $R_9$ and $R_{10}$ can be bonded together to form a cyclic structure. Illustrative anhydrides can include, but are not limited to, maleic anhydride, phthalic anhydride, acetic anhydride, succinic anhydride, styrene maleic anhydride, naphthalic anhydride, 1,2,4-benzenetricarboxylic anhydride, or any combination or mixture thereof.

In addition to the carboxylic acid homopolymers, other suitable homopolymers can include, but are not limited to, polyethylene, polypropylene, polystyrene, polyvinylchloride, or any combination or mixture thereof.

In addition to the carboxylic acid copolymers, other suitable copolymers can include, but are not limited to, alternating copolymers, periodic copolymers, statistical copolymers, terpolymers, block copolymers, linear copolymers, branched copolymers, or any combination or mixture thereof. The alternating copolymer can be represented by the formula: ~ABABABABABABABAB~. Illustrative alternating copolymers can include, but are not limited to, poly[styrene-alt-(maleic anhydride)], poly[(ethylene glycol)-alt-(terephthalic acid; isophthalic acid)], or a mixture thereof. The periodic copolymer can be represented by the formula: ~A-B-A-B-B-A-A-A-A-B-B-B~. Illustrative periodic copolymers can include, but are not limited to, poly(1,3,6-trioxacyclooctane) poly(oxymethyleneoxyethyleneoxyethylene). The statistical copolymer can be represented by the formula: ~ABBAAABAABBBABAABA~. Illustrative statistical copolymers can include, but are not limited to, poly(styrene-stat-acrylonitrile-stat-butadiene), poly[(6-aminohexanoic acid)-stat-(7-aminoheptanoic acid)], poly[(4-hydroxybenzoic acid)-co-hydroquinone-co-(terephthalic acid)], poly[styrene-co-(methyl methacrylate)], or any combination or mixture thereof. Illustrative terpolymers can include, but are not limited to, acrylonitrile-butadiene-styrene terpolymer, or any combination or mixture thereof. The block copolymer can be represented by the formula: ~AAAAA-BBBBBBB~AAAAAAA~BBB~. Illustrative block copolymers can include, but are not limited to, polystyrene-block-polybutadiene-block-polystyrene, poly(ethylene glycol)-polypropylene glycol)-poly(ethylene glycol) block polymer, poly[poly(methyl methacrylate)-block-polystyrene-block-poly(methyl acrylate)], or any combination or mixture thereof. Illustrative linear copolymers can include, but are not limited to, a copolymer of ethylene and one or more $C_3$ to $C_{20}$ alpha olefin comonomers copolymers, or any combination or mixture thereof. Illustrative branched copolymers can include, but are not limited to, branched methacrylate copolymers.

In one or more embodiments, the reaction mixture can further include one or more polyols. Suitable polyols can be represented by the following Formula IX:

$$R_{11}(OH)_n \qquad (IX)$$

where $R_{11}$ can be a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, or a substituted or unsubstituted heteroarylene; and n is an integer not less than 2. For example, n can be any integer from 2 to 10, 2 to 50, or 2 to 100.

Illustrative polyols can include, but are not limited to, 1,4-cyclohexanediol catechol, cyanuric acid, diethanolamine, pryogallol, butanediol, 1,6-hexane diol, 1,2,6 hexanetriol, 1,3 butanediol, 1,4-cyclohexane dimethanol, 2,2,4 trimethylpentanediol, alkoxylated bisphenol A, bis[N,N di beta-hydroxyethyl)]adipamid, bisphenol A, bisphenol A diglycidyl ether, bisphenol F diglycidyl ether, cyclohexanedimethanol, dibromoneopentyl glycol, polyglycerol, diethylene glycol, dipropylene glycol, glycol ethers, ethoxylated DETA, ethylene glycol, glycerine, neopentyl glycol, pentaerythritol, low molecular weight (e.g., a weight average molecular weight of about 750 or less) polyethylene glycol and/or polypropylene glycol, 1,3-propanediol, propylene glycol, polyethylene oxide (hydroxy terminated), sorbitol, tartaric acid, tetrabromoalkoxylate bisphenol A, tetrabromobisphenol A, tetrabromobisphenol diethoxy ether, triethanolamine, triethylene glycol, trimethylolethane, ethyle diethanolamine, methyl diethanolamine, one or more carbohydrates, polyvinyl alcohols, hydroxyethylcellulose, resorcinol, pyrogallol, glycollated ureas, lignin, trimethylolpropane, tripropylene glycol, or any combination or mixture thereof. The one or more carbohydrates can include one or more monosaccharides, disaccharides, oligosaccharides, polysaccharides, or any combination or mixture thereof.

One particular subclass of polyols can include carbohydrates. Suitable carbohydrates can include monosaccharides, disaccharides, oligosaccharides, polysaccharides, or any combination or mixture thereof. The carbohydrate can include one or more aldose sugars. The monosaccharide can be or include d-glucose (dextrose monohydrate), 1-glucose, or a combination or mixture thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination or mixture thereof. The carbohydrate can also be or include one or more reduced or modified starches such as dextrin, maltodextrin, and oxidized maltodextrins.

The reaction mixture can include from a low of about 0.1 wt %, about 1 wt %, about 5 wt %, about 10 wt %, or about 15 wt % to a high of about 25 wt %, about 30 wt %, about 35 wt %, about 40 wt %, or about 45 wt % of the polyol, based on the combined weight of the hydroxybenzene compound, the aldehyde compound, the additive, and the polyol. For example, the reaction mixture can include about 0.5 wt % to about 15 wt %, about 5 wt % to about 20 wt %, about 10 wt % to about 30 wt %, about 3 wt % to about 12 wt %, about 8 wt % to about 28 wt %, about 23 wt % to about 35 wt %, about 4 wt % to about 12 wt %, or about 1 wt % to about 20 wt % of the polyol, based on the combined weight of the hydroxybenzene compound, the aldehyde compound, the additive, and the polyol. In another example, the reaction mixture can include at least 0.1 wt %, at least 0.5 wt %, at least 1 wt %, at least 2 wt %, at least 3 wt %, at least 4 wt %, at least 5 wt %, at least 7 wt %, or at least 10 wt % to about 15 wt %, about 20 wt %, about 25 wt %, about 30 wt %, about 35 wt %, or about 40 wt % of the polyol, based on the combined weight of the hydroxybenzene compound, the aldehyde compound, the additive, and the polyol.

The solids content of the reaction mixture and/or the prepolymer can vary from a low of about 5%, about 10%, about 15%, about 20%, about 25%, about 35%, about 40%, or about 45% to a high of about 55%, about 60%, about 65%, about 70%, about 75%, about 80%, about 85%, about 90%, about 95%, or about 99%. For example, the solids content of the reaction mixture and/or the prepolymer can be from about 35% to about 70%, about 40% to about 60%, or about 45% to about 55%. In another example, the solids content of the reaction mixture and/or the prepolymer can be greater than 20%, greater than 25%, greater than 30%, greater than 35%, greater than 40%, or great than 45%, great than 50%, great than 55%, great than 60%, great than 65%, great than 70%, great than 75%, great than 80%, great than 85%, or great than 90%. In another example, the solids content of the reaction mixture and/or the prepolymer can be less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, or less than 15%.

The solids content of a composition, as understood by those skilled in the art, can be measured by determining the weight loss upon heating a small sample (e.g., about 1 gram to about 5 grams) of the composition, to a suitable temperature, e.g., 125° C., and a time sufficient to remove the liquid. By measuring the weight of the sample before and after heating, the percent solids in the composition can be directly calculated or otherwise estimated.

The catalyst can be combined with the reaction mixture to accelerate the formation of the prepolymer and/or the wet gel. The catalyst can be or include one or more acids, one or more bases, or any mixture thereof. Illustrative acid catalysts can include, but is not limited to, hydrochloric acid, sulfuric acid, phosphoric acid, phosphorous acid, sulfonic acid (including but not limited to monosulfonic acid, disulfonic acid, trisulfonic acid, toluene sulfonic acid, and alkane sulfonic acid), gallic acid, oxalic acid, picric acid, or any combination or mixture thereof. Other suitable acid catalyst can include one or more of the carboxylic acids discussed and described above. For example, the acidic catalyst can be or include acetic acid, citric acid, or a mixture thereof. It should be noted that the catalyst, if present, may or may not react with one or more components of the reaction mixture.

Illustrative base catalysts can include, but are not limited to, hydroxides, carbonates, ammonia, amines, or any combination or mixture thereof. Illustrative hydroxides can include, but are not limited to, sodium hydroxide, potassium hydroxide, ammonium hydroxide (e.g., aqueous ammonia), lithium hydroxide, cesium hydroxide, or any combination or mixture thereof. Illustrative carbonates can include, but are not limited to, sodium carbonate, potassium carbonate, ammonium carbonate, or any combination or mixture thereof. Illustrative amines can include, but are not limited to, alkanolamines, polyamines, aromatic amines, and any combination or mixture thereof. Illustrative alkanolamines can include, but are not limited to, monoethanolamine (MEA), diethanolamine (DEA), triethanolamine (TEA), or any combination or mixture thereof. Illustrative alkanolamines can include, but are not limited to, diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho-toluidine, meta-toluidine, para-toluidine, n-methyl aniline, N-N'-dimethyl aniline, di phenyl amines and triphenyl amines, 1-naphthylamine, 2-naphthylamine, 4-aminophenol, 3-aminophenol, 2-aminophenol, or any combination or mixture thereof. Illustrative polyamines can include, but are not limited to, diethylenetriamine (DETA), triethylenetetramine (TETA), tetraethylenepentamine (TEPA), or any combination or mixture thereof. Other polyamines can include, for example, 1,3-propanediamine, 1,4-butanediamine, polyamidoamines, polyethylenimines, or any combination or mixture thereof.

Other suitable amines can include, but are not limited to, primary amines ("$NH_2R^1$"), secondary amines ("$NHR^1R^2$"), and tertiary amines ("$NR^1R^2R^3$"), where each $R^1$, $R^2$, and $R^3$ can independently be selected from alkyls, cycloalkyls, heterocycloalkyls, aryls, heteroaryls, and substituted aryls. The alkyl can include branched or unbranched alkyls having 1 carbon atom to about 15 carbon atoms or 1 carbon atom to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include 3 carbon atoms to about 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups can include one aromatic ring or two or three fused or linked aromatic rings, e.g., phenyl, naphthyl, biphenyl, anthracenyl, phenanthrenyl, and the like. In one or more embodiments, aryl substituents can have 1 carbon atom to about 20 carbon atoms.

The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine. Illustrative amides can include, but are not limited to, acetamide (ethanamide), dicyandiamide, and the like, or any combination or mixture thereof.

In at least one example, the catalyst can be free or substantially free from any metal or metal ions. In other words, the catalyst can be a non-metal or non-metal ion containing catalyst. A catalyst that is substantially free from any metal or metal ions can contain less than 1 wt %, less than 0.5 wt %, less than 0.3 wt %, less than 0.2 wt %, less than 0.1 wt %, less than 0.7 wt %, less than 0.05 wt %, less than 0.3 wt %, less than 0.01 wt %, less than 0.007 wt %, less than 0.005 wt %, less than 0.003 wt %, less than 0.001 wt %, less than 0.0007 wt %, or less than 0.0005 wt %, based on the total weight of the catalyst.

The catalyst can be present in the reaction mixture in widely varying amounts. For example, the reaction mixture can include from a low of about 0.01 wt %, about 0.05 wt %, about 0.1 wt %, about 0.5 wt %, about 1 wt %, or about 1.5 wt % to a high of about 30 wt %, about 40 wt %, about 50 wt %, or about 60 wt % of the catalyst, based on the combined weight of the hydroxybenzene compound, the aldehyde compound, the solvent, the catalyst, and the additive. In another example, the reaction mixture can include from a low of about 0.01 wt %, about 0.02 wt %, about 0.03 wt %, about 0.04 wt %, about 0.05 wt %, about 0.1 wt %, about 0.5 wt %, about 1 wt %, about 3 wt %, or about 5 wt % to a high of about 45 wt %, about 55 wt %, about 65 wt %, about 70 wt %, about 75 wt %, or about 80 wt % of the catalyst, based on the weight of the hydroxybenzene compound. In another example, the reaction mixture can include from a low of about 0.01 wt %, about 0.02 wt %, about 0.03 wt %, or about 0.04 wt % to a high of about 40 wt %, about 50 wt %, about 60 wt %, about 70 wt %, or about 80 wt % of the catalyst, based on the weight of the aldehyde compound. In another example, the reaction mixture can include from a low of about 0.01 wt %, about 0.02 wt %, about 0.03 wt %, or about 0.04 wt % to a high of about 40 wt %, about 50 wt %, about 60 wt %, or about 70 wt % of the catalyst, based on the combined weight of the hydroxybenzene compound and the aldehyde compound.

If any one or more of the components discussed and described herein include two or more different compounds, those two or more different compounds can be present in any ratio with respect to one another. For example, if the hydroxybenzene includes a first hydroxybenzene compound and a second hydroxybenzene compound, the hydroxybenzene compound can have a concentration of the first hydroxybenzene compound ranging from about 0.1 wt % to about 99.9 wt % and conversely about 99.9 wt % to about 0.1 wt % of the second hydroxybenzene compound, based on the total weight of the first and second hydroxybenzene compounds. In another example, the amount of the first hydroxybenzene compound can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second hydroxybenzene compounds. When the aldehyde compound, carboxylic acid, anhydride, homopolymer, copolymer, catalyst, solvent, and/or any other component includes two or more different compounds, those two or more different compounds can be present in similar amounts as the first and second hydroxybenzene compound.

If the wet gel is in the form of a monolithic structure, the monolithic structure can have any desired shape. Typically the monolithic structure can take the form or shape of the reaction vessel the wet gel is produced or made in. For example, if the reaction vessel has an inner cylindrical surface having a diameter of 25 cm, the monolithic wet gel made in the reaction vessel can be in the form of a cylinder having a diameter of about 25 cm and a height corresponding to or dependent on the amount of reactants added to the reaction vessel.

If the wet gel is in the form of a monolithic structure the monolithic structure can be converted into particles. For example, the monolithic structure can be ground, chopped, crushed, milled, or otherwise acted upon to provide a plurality of particulates or particles. Accordingly, the wet gel can be produced as a monolithic structure in the reaction vessel and dried as is or particulated prior to drying or the wet gel can be directly produced as wet gel particles.

The wet gel particles can have an average cross-sectional length of about 0.1 about about 100 about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm or more. For example, the wet gel particles can have an average cross-sectional length from a low of about 0.001 mm, about 0.01 mm, about 0.1 mm, about 0.5 mm, about 1 mm, about 1.5 mm, about 2 mm, about 2.5 mm, about 3 mm, about 3.5 mm, or about 4 mm to a high of about 5 mm, about 7 mm, about 10 mm, about 12 mm, about 15 mm, about 18 mm, about 20 mm, about 25 mm, about 30 mm or more. In another example, the wet gel particles can have an average cross-sectional length from a low of about 1 about 10 about 50 about 100 about 200 about 300 about 500 about 700 or about 1,000 µm to a high of about 1.1 mm, about 1.3 mm, about 1.5 mm, about 2 mm, about 3 mm, about 4 mm, about 5 mm, about 7 mm, about 10 mm, or more.

It has been surprisingly and unexpectedly discovered that reacting at least the hydroxybenzene compound and the aldehyde compound with and/or in the presence of the carboxylic acid, the anhydride, the homopolymer, and/or the copolymer can produce a wet gel that can be converted to a dried gel under a vacuum, at atmospheric pressure, or at a pressure that is less than the supercritical pressure of any solvent present in the wet gel to produce a dried gel having one or more improved properties as compared to a wet gel made in the absence of the carboxylic acid, the anhydride, the homopolymer, and/or the copolymer. The one or more improved properties can include, but are not limited to, an increased pore volume, an increased pore size, an increased specific surface area, decreased density, or any combination or mixture thereof.

As used herein, the term "dried gel" refers to a network of polymer chains having one or more pores or voids therein and a gas occupying or filling the one or more pores or voids.

The gas can be or include, but is not limited to, oxygen, nitrogen, argon, helium, carbon monoxide, carbon dioxide, or any mixture thereof. In at least one specific example, the gas occupying or filling the voids can be or include air. The dried gel can be or include a cured product. For example the dried gel can be or include a wet gel in which the polymer changes have undergone toughening or hardening via an increased degree of cross-linking.

The wet gel can be dried at a pressure of less than the critical pressure of the liquid within the pores or voids of the wet gel. For example, if the wet gel includes water within the pores or voids thereof the pressure of the wet gel during drying can remain below the critical pressure of water. The wet gel, regardless of the particular liquid within the pores or voids of the wet gel can be subjected to a pressure that remains below the critical pressure (about 7.38 MPa) of carbon dioxide during drying. The wet gel can be dried at a pressure of less than 5,000 kPa, less than 4,000 kPa, less than 3,000 kPa, less than 2,000 kPa, less than 1,000 kPa, less than 900 kPa, less than 800 kPa, less than 700 kPa, less than 600 kPa, less than 500 kPa, less than 400 kPa, less than 300 kPa, less than 200 kPa, less than 150 kPa, less than 125 kPa, or less than 100 kPa. In at least one example, the wet gel can be dried at atmospheric pressure. In at least one other example, the wet gel can be dried at a pressure of less than atmospheric pressure. For example, the wet gel can be dried at a pressure of about 100 kPa, about 95 kPa, about 90 kPa, about 80 kPa, about 70 kPa, about 60 kPa, about 50 kPa, about 50 kPa, or less.

The wet gel can be dried by heating the wet gel to an elevated temperature from a low of about 5° C., about 10° C., about 15° C., about 20° C., or about 25° C., to a high of about 80° C., about 90° C., about 100° C., about 150° C., about 200° C., or about 300° C. For example, the wet gel can be heated to a temperature of about 5° C. to about 300° C., about 10° C. to about 200° C., about 15° C. to about 150° C., or about 25° C. to about 100° C. to produce the dried gel. In another example, the wet gel can be heated to a temperature of greater than 25° C. and less than 300° C., less than 250° C., less than 200° C., less than 150° C., less than 100° C., or less than 50° C. to produce the dried gel. In another example, the wet gel can be heated to a temperature of about 5° C. to about 300° C. while at atmospheric pressure or a pressure of less than 250 kPa, less than 200 kPa, less than 150 kPa, or less than 125 kPa to produce the dried gel.

When heating the wet gel to produce the dried gel, the wet gel can be heated to the elevated temperature at a rate from a low of about 0.01° C./min, about 0.5° C./min, about 1° C./min, or about 2° C./min, to a high of about 10° C./min, about 15° C./min, about 25° C./min, or about 50° C./min. For example, the wet gel can be heated to the elevated temperature at a rate of about 0.5° C./min to about 50° C./min, about 1° C./min to about 25° C./min, about 2° C./min to about 15° C./min, or about 3° C./min to about 10° C./min. In another example, the wet gel can be placed directly into a furnace or other heating device providing an environment already at the elevated temperature. In another example, the wet gel can be exposed to microwaves and/or any other energy source that can rapidly heat the wet gel to produce the dried gel. As such, the temperature of the wet gel can be increased at a near infinite heating rate. Accordingly, the temperature of the wet gel can be increased at any desired rate.

The wet gel can be heated at the elevated temperature for a period of time from a low of about 0.01 hours, about 0.5 hours, about 1 hour, about 2 hours, or about 3 hours to a high of about 24 hours, about 48 hours, about 72 hours, about 144 hours, about 288 hours, or more to produce the dried gel. For example, the wet gel can be heated to the elevated temperature for a period of time of about 0.5 hours to about 72 hours, about 1 hour to about 48 hours, about 2 hours to about 24 hours, about 3 hours to about 12 hours, or about 4 hours to about 6 hours to produce the dried gel. In another example, the wet gel can be heated to the elevated temperature for a period of time from about 1 hour to less than 288 hours, less than 144 hours, less than 72 hours, or less than 48 hours to produce the dried gel. In another example, the wet gel can be heated to the elevated temperature for a period of time of at least 0.01 hours, at least 0.5 hours, at least 1 hour, at least 2 hours, or at least 3 hours and less than 288 hours to produce the dried gel.

The wet gel can be heated in any desired atmosphere. For example, the wet gel can be heated in an inert gas atmosphere. In another example, the wet gel can be heated in a reactive gas atmosphere. Illustrative inert gases can include, but are not limited to, nitrogen, argon, helium, or any mixture thereof. Illustrative reactive gases can include, but are not limited to, ammonia, hydrogen fluoride, hydrogen chloride, or any mixture thereof. In another example, the wet gel can be heated in air, oxygen-rich air (greater than 21% of oxygen), or oxygen-lean air (21% or less of oxygen). Other suitable gases can include, but are not limited to, carbon dioxide, methane, or a mixture thereof.

It should be noted that the wet gel can be converted or otherwise made into the dried gel under any combination of temperature, pressure, atmosphere, temperature rate increase, pressure rate decrease and/or increase. For example, the wet gel can be heated under a vacuum in a microwave. In another example, the wet gel can be heated at atmospheric pressure in a furnace. In another example the wet gel can be heated at atmospheric pressure or a pressure greater than atmospheric pressure in a furnace, a microwave, or other heating device.

The process used to dry the wet gel can be free of any solvent exchange. Said another way, the liquid within the pores or voids of the wet gel can be removed without first replacing the liquid with a different liquid. One conventional drying process can include replacing water within the pores or voids of a wet gel with an organic solvent, e.g., acetone, than water. The wet gels discussed and described herein can be dried without undergoing any exchange of liquid, which is often referred to as "solvent exchange."

The dried gel can have a pore volume from a low of about 0.03 cm$^3$/g, about 0.05 cm$^3$/g, about 0.1 cm$^3$/g, about 0.3 cm$^3$/g, or about 0.5 cm$^3$/g to a high of about 1 cm$^3$/g, about 1.5 cm$^3$/g, about 2 cm$^3$/g, or about 2.5 cm$^3$/g. For example, the dried gel can have a pore volume of at least 0.1 cm$^3$/g, at least 0.2 cm$^3$/g, at least 0.25 cm$^3$/g, at least 0.3 cm$^3$/g, at least 0.35 cm$^3$/g, at least 0.4 cm$^3$/g, at least 0.45 cm$^3$/g, at least 0.5 cm$^3$/g, at least 0.55 cm$^3$/g, 0.6 cm$^3$/g, at least 0.65 cm$^3$/g, at least 0.7 cm$^3$/g, at least 0.75 cm$^3$/g, or at least 0.8 cm$^3$/g to a high of about 0.9 cm$^3$/g, about 0.95 cm$^3$/g, about 1 cm$^3$/g, about 1.05 cm$^3$/g, about 1.1 cm$^3$/g, about 1.15 cm$^3$/g, about 1.2 cm$^3$/g, about 1.25 cm$^3$/g, about 1.3 cm$^3$/g, about 1.35 cm$^3$/g, about 1.4 cm$^3$/g, about 1.45 cm$^3$/g, about 1.5 cm$^3$/g, about 1.6 cm$^3$/g, about 1.7 cm$^3$/g, about 1.8 cm$^3$/g, about 1.9 cm$^3$/g, about 2 cm$^3$/g, about 2.1 cm$^3$/g, about 2.2 cm$^3$/g, about 2.3 cm$^3$/g, about 2.4 cm$^3$/g, or about 2.5 cm$^3$/g. In another example, the dried gel can have a pore volume from about 0.2 cm$^3$/g to about 2 cm$^3$/g, about 0.4 cm$^3$/g to about 1.8 cm$^3$/g, about 0.6 cm$^3$/g to about 1.4 cm$^3$/g, about 1 cm$^3$/g to about 1.9 cm$^3$/g, or about 0.3 cm$^3$/g to about 1.7 cm$^3$/g. The pore volume of the dried gel activation can be measured using the nitrogen sorption technique as commonly known in the art.

The dried gel can have a pore size from a low of about 1 nm, about 1.5 nm, about 2 nm, about 5 nm, about 10 nm, about 15 nm, about 20 nm, about 25 nm, about 30 nm, about 25 nm, about 40 nm, about 45 nm, about 50 nm, about 51 nm, about 52 nm, about 53 nm, about 54 nm, or about 55 nm to a high of about 80 nm, about 90 nm, about 100 nm, about 110 nm, about 120 nm, about 130 nm, about 140 nm, about 150 nm, about 200 nm, about 250 nm, about 300 nm, about 350 nm, about 400 nm, about 450 nm, or about 500 nm. For example, the dried gel can have a pore size of at least 10 nm, at least 20 nm, at least 30 nm, at least 40 nm, at least 50 nm, at least 55 nm, or at least 60 nm to a high of about 80 nm, about 90 nm, about 100 nm, about 110 nm, about 120 nm, about 130 nm, about 140 nm, about 150 nm, about 200 nm, about 250 nm, about 300 nm, about 350 nm, about 400 nm, about 450 nm, or about 500 nm. In another example, the dried gel can have a pore size from about 1.5 nm to about 150 nm, about 10 nm to about 80 nm, about 30 nm to about 90 nm, about 80 nm to about 100 nm. The pore size of the dried gel can be measured according to the Barret-Joyner-Halenda or "BJH" technique (described in E. P. Barret, L. G. Joyner, and P. P. Halenda, J. Amer. Chem. Soc., 73, 373 (1951)). The pore size of the dried gel can also be measured according to the density functional theory or "DFT" technique (described in Advances in Colloid and Interface Science, Volumes 76-77, July 1998, pp. 203-226, by P. I. Ravikovitch, G. L. Haller, and A. V. Neimark and C. Lastoski, K. E. Gubbins, and N. Quirke, J. Phys. Chem., 1993, 97 (18), pp. 4786-4796). The pore size referred to herein, unless otherwise noted, is the peak of the pore size distribution curve.

The dried gel can have a specific surface area from a low of about 5 m$^2$/g, about 10 m$^2$/g, about 25 m$^2$/g, about 50 m$^2$/g, about 100 m$^2$/g, about 200 m$^2$/g, about 300 m$^2$/g, about 400 m$^2$/g, about 500 m$^2$/g, or about 600 m$^2$/g to a high of about 700 m$^2$/g, about 800 m$^2$/g, about 900 m$^2$/g, about 1,000 m$^2$/g, about 1,100 m$^2$/g, about 1,200 m$^2$/g, about 1,300 m$^2$/g, about 1,400 m$^2$/g, or about 1,500 m$^2$/g. For example, the dried gel can have a specific surface area of at least 5 m$^2$/g, at least 20 m$^2$/g, at least 30 m$^2$/g, at least 40 m$^2$/g, or at least 50 m$^2$/g to a high of about 100 m$^2$/g, about 400 m$^2$/g, about 700 m$^2$/g, or about 1000 m$^2$/g. In another example, the dried gel can have a specific surface area from about 20 m$^2$/g to about 700 m$^2$/g, about 20 m$^2$/g to about 400 m$^2$/g, about 40 m$^2$/g to about 90 m$^2$/g, about 50 m$^2$/g to about 100 m$^2$/g, or about 60 m$^2$/g to about 400 m$^2$/g. The surface area of the dried gel refers to the total specific surface area of the dried gel measured according to the Brunauer-Emmett-Teller or "BET" technique (described in S. Brunauer, P. H. Emmett, and E. Teller, J. Amer. Chem. Soc., 60, 309 (1938)). The BET technique employs an inert gas, for example nitrogen, to measure the amount of gas adsorbed on a material and is commonly used in the art to determine the accessible surface area of materials.

The dried gel can have a pore size of about 10 nm to about 100 nm and a pore volume of about 0.2 cm$^3$/g to about 2 cm$^3$/g. For example, the dried gel can have a pore size of about 60 nm to about 120 nm, about 10 nm to about 80 nm, or about 80 nm to about 100 nm and a pore volume of about 0.3 cm$^3$/g to about 1.8 cm$^3$/g, about 0.2 cm$^3$/g to about 2 cm$^3$/g, or about 0.25 cm$^3$/g to about 1.5 cm$^3$/g. In another example, the dried gel can have pore size of at least 10 nm, at least 30 nm, at least 50 nm, or at least 60 nm to a high of about 80 nm, about 100 nm, about 125 nm, or about 150 nm and a pore volume of at least 0.4 cm$^3$/g, at least 0.5 cm$^3$/g, at least 0.6 cm³/g, or at least 0.7 cm³/g to a high of about 1 cm³/g, about 1.2 cm³/g, about 1.5 cm³/g, about 1.8 cm³/g, or about 2 cm³/g.

The dried gel can have a pore size of about 10 nm to about 100 nm and a specific surface area of about 5 m²/g to about 1,500 m²/g. For example, the dried gel can have a pore size of about 60 nm to about 120 nm, about 10 nm to about 80 nm, or about 80 nm to about 100 nm and a specific surface area of about 20 m²/g to about 600 m²/g, about 20 m²/g to about 400 m²/g, or about 60 m²/g to about 450 m²/g. In another example, the dried gel can have pore size of at least 10 nm, at least 30 nm, at least 50 nm, or at least 60 nm to a high of about 80 nm, about 100 nm, about 125 nm, or about 150 nm and a specific surface area of at least 5 m²/g, at least 10 m²/g, at least 15 m²/g, at least 20 m²/g, at least 40 m²/g, or at least 50, or at least 60 m²/g to a high of about 350 m²/g, about 400 m²/g, about 500 m²/g, about 600 m²/g, about 700 m²/g, or about 1000 m²/g.

The dried gel can have a specific surface area of about 5 m²/g to about 1,500 m²/g and a pore volume of about 0.2 cm³/g to about 2 cm³/g. For example, the dried gel can have a specific surface area of about 20 m²/g to about 600 m²/g, about 20 m²/g to about 400 m²/g, or about 60 m²/g to about 450 m²/g and a pore volume of about 0.3 cm³/g to about 1.8 cm³/g, about 0.2 cm³/g to about 2 cm³/g, or about 0.25 cm³/g to about 1.5 cm³/g. In another example, the dried gel can have a specific surface area of at least 5 m²/g, at least 20 m²/g, at least 40 m²/g, or at least 50 m²/g, or at least 60 m²/g to a high of about 100 m²/g, about 400 m²/g, about 500 m²/g, about 600 m²/g, about 700 m²/g, or about 1000 m²/g and a pore volume of at least 0.4 cm³/g, at least 0.5 cm³/g, at least 0.6 cm³/g, or at least 0.7 cm³/g to a high of about 1 cm³/g, about 1.2 cm³/g, about 1.5 cm³/g, about 1.8 cm³/g, or about 2 cm³/g.

The dried gel can have a pore size of about 10 nm to about 100 nm, a specific surface area of about 5 m²/g to about 1,500 m²/g, and a pore volume of about 0.2 cm³/g to about 2 cm³/g. For example, the dried gel can have a pore size of about 60 nm to about 120 nm, about 10 nm to about 80 nm, or about 80 nm to about 100 nm, a specific surface area of about 20 m²/g to about 600 m²/g, about 20 m²/g to about 400 m²/g, or about 60 m²/g to about 450 m²/g and a pore volume of about 0.3 cm³/g to about 1.8 cm³/g, about 0.2 cm³/g to about 2 cm³/g, or about 0.25 cm³/g to about 1.5 cm³/g. In another example, the dried gel can have pore size of at least 10 nm, at least 30 nm, at least 50 nm, or at least 60 nm to a high of about 80 nm, about 100 nm, about 125 nm, or about 150 nm, a specific surface area of at least 5 m²/g, at least 20 m²/g, at least 40 m²/g, or at least 50 m²/g, or at least 60 m²/g to a high of about 100 m²/g, about 400 m²/g, about 500 m²/g, about 600 m²/g, about 700 m²/g, or about 1000 m²/g, and a pore volume of at least 0.4 cm³/g, at least 0.5 cm³/g, at least 0.6 cm³/g, or at least 0.7 cm³/g to a high of about 1 cm³/g, about 1.2 cm³/g, about 1.5 cm³/g, about 1.8 cm³/g, or about 2 cm³/g.

The dried gel can be used as is or the dried gel can be subjected to a carbonization or pyrolysis process to remove at least a portion of the non-carbon components, e.g., hydrogen, oxygen, nitrogen, and other non-carbon atoms, from the dried particles. The resulting carbonized or pyrolized product contains carbon and can be referred to as a pyrolized carbon product. Any pyrolysis process can be used. In one example, the dried gel can be placed into a rotary kiln and heated therein. The pyrolysis process can be carried out under an inert atmosphere, e.g., a nitrogen, argon, or other inert gas or gas mixture. The inert gas or gas mixture can be any gas or mixture of gases that do not react with the wet gel or the dried gel when the wet gel and/or the dried gel is heated in the presence thereof. Pyrolysis processes are well known to those of skill in the art. Suitable pyrolysis processes can include those discussed and described in U.S. Pat. Nos. 4,873,218; 4,997,804; 5,124,364; and 5,556,892.

The duration of the pyrolysis, e.g., the period of time during which the dried gel is maintained at the elevated temperature can range from a low of about 30 seconds, about 1 minute, about 5 minutes, about 10 minutes, about 20 minutes, or about 30 minutes to a high of about 1 hour, about 2 hours, about 3 hours, about 5 hours, about 7 hours, about 20 hours, or longer. The dried gel can by pyrolized by heating the dried gel to a temperature from a low of about 500° C., about 600° C., about 700° C., about 800° C., about 900° C., or about 1,000° C. to a high of about 1,500° C., about 1,700° C., about 1,900° C., about 2,100° C., about 2,300° C. or about 2,400° C. For example, the pyrolysis dwell temperature can be from about 500° C. to about 2,400° C., about 600° C. to about 1,800° C., about 600° C. to about 1,200° C., or about 650° C. to about 1,100° C.

It should be noted that if a pyrolyzed carbon product is desired, the wet gel can be heated directly to the pyrolysis temperature. For example, a wet gel can be placed into a furnace, oven, or other heating device and can be heated from room temperature (e.g., about 25° C.) to a pyrolysis temperature from about 500° C. to about 2,400° C. for the desired time to produce the pyrolyzed carbon product. The temperature ramp rate can be the same or similar to the temperature ramp rate used to produce the dried gel including direct placement of the wet gel into a furnace or other environment already heated to the elevated temperature.

The pyrolized carbon product can be activated and such product can be referred to as an activated carbon product. Alternatively, the wet gel, the dried gel, and/or the pyrolized carbon product can be activated to produce the activated carbon product. Activating the wet gel, the dried gel, and/or the pyrolized carbon product can include any activation process or combination of activation processes known to those skilled in the art. The activation time and/or activation temperature can affect the performance of the resulting activated carbon material, as well as the manufacturing cost thereof. For example, increasing the activation temperature and the activation dwell time can yield a higher or increased activation percentage of the pyrolized carbon product, but can also correspond to the removal of more material compared to lower temperatures and shorter dwell times. As such, higher activation can increase performance of the final activated carbon, but it can also increase the cost of the process by reducing the overall carbonized product.

Pyrolized particles (or monolithic structures) can be activated by contacting the pyrolized carbon product with an activating agent to produce an activated product or activated carbon product. Illustrative activating agents can be or include gases such as carbon monoxide, carbon dioxide, steam, oxygen, or any combination or mixture thereof. Other activating agents can include other compounds or chemicals.

The activation process can range from about 1 minute to about 2 days, about 5 minutes to about 1 day, about 1 minute to about 18 hours, about 1 minute to about 12 hours, about 5 minutes to about 8 hours, about 1 minute to about 10 minutes, or about 1 hour to about 5 hours.

In one example of an activation process, the pyrolized particles can be weighed and placed in a rotary kiln and an automated gas control manifold and controller can be set to ramp rate of about 20° C. per minute. Carbon dioxide can be introduced to the kiln environment for a period of time once the proper activation temperature has been reached. After activation has occurred, the carbon dioxide can be replaced by nitrogen and the kiln can be cooled down. The recovered activated particles can be weighed at the end of the process to assess the level of activation. Other activation processes are well known to those of skill in the art. The activation temperature can range from a low of about 700° C., about 800° C., about 850° C., or about 900° C. to a high of about 1,100° C., about 1,200° C., about 1,300° C., or about 1,500° C. For example, the activation temperature can range from about 800° C. to about 1,300° C., about 900° C. to about 1,050° C., or about 900° C. to about 1,000° C. One skilled in the art will recognize that other activation temperatures, either lower or higher, may be employed. In one or more embodiments, the wet gel, the dried gel, and/or the pyrolized particle can be activated by heating to a temperature of about 500° C. to about 1,300° C. in an atmosphere that includes carbon dioxide, carbon monoxide, steam, oxygen, or any combination or any mixture thereof to produce the activated carbon product.

The degree of activation can be measured in terms of the mass percent of the pyrolized particles that is lost during the activation step. The degree of activation can range anywhere from a low of about 1%, about 5%, about 10%, about 20%, about 30%, about 40%, or about 50% to a high of about 60%, about 70%, about 80%, about 90%, about 95%, or about 99%.

The pore volume, pore size, and specific surface area of the pyrolized carbon product and the activated carbon product can be measured with the same techniques used to measure the dried gel. The pyrolized and/or the activated carbon product can have a pore volume from a low of about 0.03 cm$^3$/g, about 0.05 cm$^3$/g, about 0.1 cm$^3$/g, about 0.3 cm$^3$/g, or about 0.5 cm$^3$/g to a high of about 1 cm$^3$/g, about 1.5 cm$^3$/g, about 2 cm$^3$/g, or about 2.5 cm$^3$/g. For example, the pyrolized and/or the activated carbon product can have a pore volume of at least 0.1 cm$^3$/g, at least 0.2 cm$^3$/g, at least 0.25 cm$^3$/g, at least 0.3 cm$^3$/g, at least 0.35 cm$^3$/g, at least 0.4 cm$^3$/g, at least 0.45 cm$^3$/g, at least 0.5 cm$^3$/g, at least 0.55 cm$^3$/g, 0.6 cm$^3$/g, at least 0.65 cm$^3$/g, at least 0.7 cm$^3$/g, at least 0.75 cm$^3$/g, or at least 0.8 cm$^3$/g to a high of about 0.9 cm$^3$/g, about 0.95 cm$^3$/g, about 1 cm$^3$/g, about 1.05 cm$^3$/g, about 1.1 cm$^3$/g, about 1.15 cm$^3$/g, about 1.2 cm$^3$/g, about 1.25 cm$^3$/g, about 1.3 cm$^3$/g, about 1.35 cm$^3$/g, about 1.4 cm$^3$/g, about 1.45 cm$^3$/g, about 1.5 cm$^3$/g, about 1.6 cm$^3$/g, about 1.7 cm$^3$/g, about 1.8 cm$^3$/g, about 1.9 cm$^3$/g, about 2 cm$^3$/g, about 2.1 cm$^3$/g, about 2.2 cm$^3$/g, about 2.3 cm$^3$/g, about 2.4 cm$^3$/g, or about 2.5 cm$^3$/g. In another example, the pyrolized and/or the activated carbon product can have a pore volume from about 0.2 cm$^3$/g to about 2 cm$^3$/g, about 0.4 cm$^3$/g to about 1.8 cm$^3$/g, about 0.6 cm$^3$/g to about 1.4 cm$^3$/g, about 1 cm$^3$/g to about 1.9 cm$^3$/g, or about 0.3 cm$^3$/g to about 1.7 cm$^3$/g.

The pyrolized and/or the activated carbon product can have a pore size from a low of about 1 nm, about 1.5 nm, about 2 nm, about 5 nm, about 10 nm, about 15 nm, about 20 nm, about 25 nm, about 30 nm, about 25 nm, about 40 nm, about 45 nm, about 50 nm, about 51 nm, about 52 nm, about 53 nm, about 54 nm, or about 55 nm to a high of about 80 nm, about 90 nm, about 100 nm, about 110 nm, about 120 nm, about 130 nm, about 140 nm, about 150 nm, about 200 nm, about 250 nm, about 300 nm, about 350 nm, about 400 nm, about 450 nm, or about 500 nm. For example, the pyrolized and/or the activated carbon product can have a pore size of at least 10 nm, at least 20 nm, at least 30 nm, at least 40 nm, at least 50 nm, at least 55 nm, or at least 60 nm to a high of about 80 nm, about 90 nm, about 100 nm, about 110 nm, about 120 nm, about 130 nm, about 140 nm, about 150 nm, about 200 nm, about 250 nm, about 300 nm, about 350 nm, about 400 nm, about 450 nm, or about 500 nm. In another example, the pyrolized and/or the activated carbon product can have a pore size from about 1.5 nm to about 150 nm, about 10 nm to about 80 nm, about 30 nm to about 90 nm, about 80 nm to about 100 nm.

The pyrolized and/or the activated carbon product can have a specific surface area from a low of about 5 m$^2$/g, about 10 m$^2$/g, about 25 m$^2$/g, about 50 m$^2$/g, about 100 m$^2$/g, about 200 m$^2$/g, about 300 m$^2$/g, about 400 m$^2$/g, about 500 m$^2$/g, or about 600 m$^2$/g to a high of about 700 m$^2$/g, about 800 m$^2$/g, about 900 m$^2$/g, about 1,000 m$^2$/g, about 1,100 m$^2$/g, about 1,200 m$^2$/g, about 1,300 m$^2$/g, about 1,400 m$^2$/g, or about 1,500 m$^2$/g. For example, the pyrolized and/or the activated carbon product can have a specific surface area of at least 150 m$^2$/g, at least 200 m$^2$/g, at least 250 m$^2$/g, at least 300 m$^2$/g, or at least 350 m$^2$/g to a high of about 750 m$^2$/g, about 850 m$^2$/g, about 1,050 m$^2$/g, or about 1,250 m$^2$/g. In another example, the pyrolized and/or the activated carbon product can have a specific surface area from about 200 m$^2$/g to about 1,000 m$^2$/g, about 200 m$^2$/g to about 800 m$^2$/g, about 300 m$^2$/g to about 550 m$^2$/g, about 350 m$^2$/g to about 600 m$^2$/g, or about 400 m$^2$/g to about 850 m$^2$/g.

The pyrolized and/or the activated carbon product can have a pore size of about 10 nm to about 100 nm and a pore volume of about 0.2 cm$^3$/g to about 2 cm$^3$/g. For example, the pyrolized and/or the activated carbon product can have a pore size of about 60 nm to about 120 nm, about 10 nm to about 80 nm, or about 80 nm to about 100 nm and a pore volume of about 0.3 cm$^3$/g to about 1.8 cm$^3$/g, about 0.2 cm$^3$/g to about 2 cm$^3$/g, or about 0.25 cm$^3$/g to about 1.5 cm$^3$/g. In another example, the pyrolized and/or the activated carbon product can have pore size of at least 10 nm, at least 30 nm, at least 50 nm, or at least 60 nm to a high of about 80 nm, about 100 nm, about 125 nm, or about 150 nm and a pore volume of at least 0.4 cm$^3$/g, at least 0.5 cm$^3$/g, at least 0.6 cm$^3$/g, or at least 0.7 cm$^3$/g to a high of about 1 cm$^3$/g, about 1.2 cm$^3$/g, about 1.5 cm$^3$/g, about 1.8 cm$^3$/g, or about 2 cm$^3$/g.

The pyrolized and/or the activated carbon product can have a pore size of about 10 nm to about 100 nm and a specific surface area of about 5 m$^2$/g to about 1,500 m$^2$/g. For example, the pyrolized and/or the activated carbon product can have a pore size of about 60 nm to about 120 nm, about 10 nm to about 80 nm, or about 80 nm to about 100 nm and a specific surface area of about 200 m$^2$/g to about 1,000 m$^2$/g, about 200 m$^2$/g to about 800 m$^2$/g, or about 400 m$^2$/g to about 900 m$^2$/g. In another example, the pyrolized and/or the activated carbon product can have pore size of at least 10 nm, at least 30 nm, at least 50 nm, or at least 60 nm to a high of about 80 nm, about 100 nm, about 125 nm, or about 150 nm and a specific surface area of at least 50 m$^2$/g, at least 100 m$^2$/g, at least 150 m$^2$/g, at least 200 m$^2$/g, at least 300 m$^2$/g, at least 350 m$^2$/g, or at least 400 m$^2$/g to a high of about 750 m$^2$/g, about 800 m$^2$/g, about 900 m$^2$/g, about 1,000 m$^2$/g, about 1,100 m$^2$/g, or about 1,250 m$^2$/g.

The pyrolized and/or the activated carbon product can have a specific surface area of about 5 m$^2$/g to about 1,500 m$^2$/g and a pore volume of about 0.2 cm$^3$/g to about 2 cm$^3$/g. For example, the pyrolized and/or the activated carbon product can have a specific surface area of about 200 m$^2$/g to about 1,000 m$^2$/g, about 200 m$^2$/g to about 800 m$^2$/g, or about 400 m$^2$/g to about 900 m$^2$/g and a pore volume of about 0.3 cm$^3$/g to about 1.8 cm$^3$/g, about 0.2 cm$^3$/g to about 2 cm$^3$/g, or about 0.25 cm$^3$/g to about 1.5 cm$^3$/g. In another example, the pyrolized and/or the activated carbon product can have a specific surface area of at least 150 m$^2$/g, at least 200 m$^2$/g, at least 300 m$^2$/g, at least 350 m$^2$/g, or at least 400 m$^2$/g to a high of about 750 m$^2$/g, about 800 m$^2$/g, about 900 m$^2$/g, about 1,000 m$^2$/g, about 1,100 m$^2$/g, or about 1,250 m$^2$/g and a pore volume of at least 0.4 cm$^3$/g, at least 0.5 cm$^3$/g, at least 0.6 cm$^3$/g, or at least 0.7 cm$^3$/g to a high of about 1 cm$^3$/g, about 1.2 cm$^3$/g, about 1.5 cm$^3$/g, about 1.8 cm$^3$/g, or about 2 cm$^3$/g.

The pyrolized and/or the activated carbon product can have a pore size of about 10 nm to about 100 nm, a specific surface area of about 5 m$^2$/g to about 1,500 m$^2$/g, and a pore volume of about 0.2 cm$^3$/g to about 2 cm$^3$/g. For example, the pyrolized and/or the activated carbon product can have a pore size of about 60 nm to about 120 nm, about 10 nm to about 80 nm, or about 80 nm to about 100 nm, a specific surface area of about 200 m$^2$/g to about 1,000 m$^2$/g, about 200 m$^2$/g to about 800 m$^2$/g, or about 400 m$^2$/g to about 900 m$^2$/g, and a pore volume of about 0.3 cm$^3$/g to about 1.8 cm$^3$/g, about 0.2 cm$^3$/g to about 2 cm$^3$/g, or about 0.25 cm$^3$/g to about 1.5 cm$^3$/g. In another example, the pyrolized and/or the activated carbon product can have pore size of at least 10 nm, at least 30 nm, at least 50 nm, or at least 60 nm to a high of about 80 nm, about 100 nm, about 125 nm, or about 150 nm, a specific surface area of at least 150 m$^2$/g, at least 200 m$^2$/g, at least 300 m$^2$/g, at least 350 m$^2$/g, or at least 400 m$^2$/g to a high of about 750 m$^2$/g, about 800 m$^2$/g, about 900 m$^2$/g, about 1,000 m$^2$/g, about 1,100 m$^2$/g, or about 1,250 m$^2$/g, and a pore volume of at least 0.4 cm$^3$/g, at least 0.5 cm$^3$/g, at least 0.6 cm$^3$/g, or at least 0.7 cm$^3$/g to a high of about 1 cm$^3$/g, about 1.2 cm$^3$/g, about 1.5 cm$^3$/g, about 1.8 cm$^3$/g, or about 2 cm$^3$/g.

In one or more embodiments, one or more modifier or composite materials can be combined with the reaction mixture, the wet gel, the dried gel, and/or the pyrolized carbon product. As used herein, the terms "modifier" and "composite material" refer to any chemical element or compound comprising a chemical element, or any combination of different chemical elements and/or compounds that can modify one or more properties of the wet gel, the dried gel, and/or the pyrolized gel. The modifier can change (increase or decrease) the resistance, capacity, power performance, composition, stability, and other properties of the wet gel, the dried gel, and/or the pyrolized gel. Examples of modifiers within the context of the present disclosure can include, but are not limited to, elements, and compounds or oxides comprising elements, in groups 12-15 of the periodic table, other elements such as sulfur, tungsten and silver and combinations or mixtures thereof. For example, the modifier can include, but are not limited to, lead, tin, antimony, bismuth, arsenic, tungsten, silver, zinc, cadmium, indium, silicon, iron, sulfur, cobalt, nickel, bromine, chlorine, ruthenium, rhodium, platinum, palladium, zirconium, gold, oxides thereof, any alloys thereof, or any mixture thereof.

In at least one example, silicon in the form of a powder can be combined with the reaction mixtures to produce a wet gel containing silicon disposed or dispersed within the wet gel. The silicon powder can have an average particle size from a low of about 0.5 µm, about 1 µm, about 2 µm, about 5 µm, or about 10 µm to a high of about 100 µm, about 500 µm, about 1,000 µm, about 2,500 µm, or about 5,000 µm. The silicon powder can have a purity of about 95%, about 97%, about 99%, about 99.5%, about 99.9%, about 99.99%, about 99.999%, or about 99.9999%.

The modifier can be present in the reaction mixture and/or the wet gel in an amount from a low of about 0.01 wt %, about 0.5 wt %, about 1 wt %, about 2 wt %, or about 3 wt % to a high of about 30 wt %, about 50 wt %, about 70 wt %, about 90 wt %, or about 95 wt %, based on the combined weight of the hydroxybenzene compound, the aldehyde compound, the additive, and the modifier in the reaction mixture. For example, the modifier can be present in the reaction mixture and/or the wet gel in an amount from about 0.01 wt % to about 90 wt %, about 1 wt % to about 70 wt %, about 2 wt % to about 50 wt %, about 3 wt % to about 30 wt %, or about 4 wt % to about 25 wt %, based on the combined weight of the hydroxybenzene compound, the aldehyde compound, the additive, and the modifier in the reaction mixture. Similarly, the modifier can be present in the reaction mixture and/or the wet gel in an amount from a low of about 0.01 wt %, about 0.5 wt %, about 1 wt %, about 2 wt %, or about 3 wt % to a high of about 30 wt %, about 50 wt %, about 70 wt %, about 90 wt %, or about 95 wt %, based on the combined weight of the pyrolized carbon product or the activated carbon product and the modifier. For example, the modifier can be present in the pyrolized and/or activated carbon product in an amount from about 0.01 wt % to about 90 wt %, about 1 wt % to about 70 wt %, about 2 wt % to about 50 wt %, about 3 wt % to about 30 wt %, or about 4 wt % to about 25 wt %, based on the combined weight of the pyrolized produce or the activated carbon product and the modifier.

In one or more embodiments, it may be desirable to produce wet gels and dried gels therefrom having little or no metal ions, e.g., silicon, sodium, iron, lithium, phosphorus, aluminum, arsenic, boron, or potassium. Impurities such as metal atoms and/or metal ions can be introduced to the polymer particles in gel form via any one or more of several possible sources, which can include, but are not limited to, the particular type of catalyst, leaching from the mixer and/or reactor into the monomer component and/or during and/or after the polymer particles in gel form are made. Accordingly, the materials used to make the mixer, line the inner surfaces or walls of the mixer, and/or components thereof, e.g., agitator blades, reactor, and the like can be chosen so as to reduce the potential or likelihood of contamination. For example, depending on a particular metal, the metal can leach or otherwise loose metal ions that can be incorporated into the polymer particle in gel form during the suspension and/or emulsion polymerization thereof.

In one or more embodiments, the wet gel, the dried gel, the pyrolized carbon product, and/or the activated carbon product can have a concentration of one or more metal atoms, one or more metal ions, or a combination of one or more metal atoms and one or more metal ions of less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, less than 0.15 wt %, less than 0.1 wt %, less than 0.7 wt %, less than 0.5 wt %, less than 0.3 wt %, less than 0.1 wt %, less than 0.09 wt %, less than 0.07 wt %, less than 0.05 wt %, less than 0.03 wt %, less than 0.01 wt %, less than 0.009 wt %, less than 0.007 wt %, less than 0.005 wt %, less than 0.003 wt %, less than 0.001 wt %, less than 0.0007 wt %, or less than 0.0005 wt %, based on a total weight of the wet gel, the dried gel, and/or the pyrolized. The concentration of any metal atoms and/or metal ions present in the wet gel, the dried gel, the pyrolized carbon product, and the activated carbon product can be measured or determined by proton induced x-ray emission or "PIXE." The metal atom(s) and/or metal ion(s) can be or include the elements having an atomic number from 11 to 92. The metal atom(s) and/or metal ion(s) can be or include elements having an atomic number of 3-5 and 11 to 92.

In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm of any one or more of the metal atoms (or metal ions) having an atomic number of 3 to 5 and/or 11 to 92. For example, in one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sodium. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm magnesium. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm silicon. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm sulfur. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm calcium. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm iron. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm nickel. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm copper. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm chromium. In one or more embodiments, the wet gel, the dried gel, the pyrolized carbon product, and/or the activated carbon product can contain less than 1,000 ppm, less than 700 ppm, less than 500 ppm, less than 300 ppm, less than 100 ppm, less than 75 ppm, less than 50 ppm, less than 25 ppm, less than 10 ppm, less than 5 ppm, or less than 1 ppm zinc. In some embodiments other impurities such as hydrogen, oxygen and/or nitrogen can be present in levels ranging from less than 10%, less than 9%, less than 8%, less than 7%, less than 6%, less than 5%, less than 4%, less than 3%, less than 2%, less than 1%, less than 0.5%, less than 0.1%, less than 0.05%, or less than 0.01%.

One way to reduce and/or eliminate contamination of metal or metal ions within the wet gel, the dried, gel, and/or the pyrolized carbon product can be to construct the mixer and/or reactor from non-reactive or very low reactive materials, materials having a reduced tendency to leach or give up metal atoms or ions to the reaction mixture as compared to materials that are known to leach metal atoms into the reaction mixture. Some potential materials that can be suitable for making the mixer and/or reactor used to produce the wet gel that can also help reduce the contamination of metal ions leaching or otherwise transferring from the mixer and/or reactor to the wet gel can include, but are not limited to, metals, glass, e.g., a glass lined vessel, fiber reinforced vessels, e.g., FRP (FRB, FRVE, FRSVE.) and Dual laminate like PP/FRP, PVC/FRP, CPVC/FRP, PVDF/FRP, ECTFE/FRP, ETFE/FRP, FEP/FRP and PFA/FRP, polymer reactors, e.g., Teflon, polyethylene (PE), polypropylene (PP), Chlorinated Poly(Vinyl Chloride) (CPVC). Illustrative metals can include, but are not limited to, cobalt, chromium, tungsten, carbon, silicon, iron, manganese, molybdenum, vanadium, nickel, boron, phosphorous, sulfur, titanium, aluminum, copper, tungsten, alloys thereof, or any combination or mixture thereof. For example, the one or more inner surfaces of the reactor can be made of steel such as stainless steels, carbon steels, tool steels, alloy steels, or any combination or mixture thereof. Illustrative steels can include, but are not limited to, A387 Grade 11 low chrome steel, 304 stainless steel, 316 stainless steel, and 347 stainless steel.

In one or more embodiments, the surfaces of the mixer and/or reactor and/or components thereof can be treated to reduce the likelihood of metal ions (or other impurities) from leaching or otherwise transferring from the surfaces to the wet gel. The inner metal surfaces can be subjected a passivation process to reduce the likelihood of contamination of the wet gel with metal ions. For example, metal surfaces of the mixer and/or reactor that contact the suspension and/or emulsion can be subjected one or more treatment processes such as carburization, boronization, and/or nitridization. In another example the inner surfaces of the mixer and/or reactor can be subjected to a pickling process. A pickling process can include treating a metal or other surface to remove one or more impurities, e.g., one or more states, inorganic contaminants, rust or scale from ferrous, copper, and/or aluminum metals or alloys. The surface can be treated with a solution or "pickle liquor" that contains one or more acids, for example. The one or more acids can be or include, but are not limited to, hydrochloric acid, sulfuric acid, nitric acid, or any combination or mixture thereof.

In one or more embodiments, the mixer and/or reactor or inner surfaces thereof can be heated in the presence of a carbon source to a temperature below the melting point of the inner surfaces, but sufficiently high to cause carbon to deposit within the outer layer or surface of the inner surfaces, e.g., the layer or surface exposed to the reaction mixture. Any suitable form of carbon can be used as the carbon source, for example carbon containing gases, liquids, solids, and/or plasmas. Illustrative gases can include, but are not limited to, carbon dioxide, methane, ethane, propane, or the like. In another example, the mixer and/or reactor or/or inner surfaces thereof can be heated in the presence of a boron source to a sufficient temperature, but below the melting point of the inner surfaces, but sufficiently high to cause boron to diffuse into the surface and form borides with the material. In yet another example, the mixer and/or reactor and/or inner surfaces thereof can be heated in the presence of a nitrogen source to a sufficient temperature, but below the melting point of the inner surfaces, causing nitrogen to diffuse into the surface and form nitrides with the material. Any suitable process can be used to nitride the inner surfaces of the mixer and/or reactor and/or other components thereof. For example, gas nitriding, liquid or salt bath nitriding, and ion or plasma nitriding can be used. In another example, the mixer and/or reactor, and/or inner surfaces thereof can under-go both carburization and nitridization ("carbonitriding") in which both carbon and nitrogen are diffused into the inner surfaces thereof. Subjecting the mixer and/or reactor and/or other components and/or inner surfaces thereof to carburization, boronization, and/or nitridization can reduce or eliminate the likelihood that metal ions or other contaminants from the mixer and/or reactor and/or other components thereof can leach or otherwise transfer therefrom to the reaction mixture and/or the wet gel.

The particles after drying, after pyrolysis, and/or after activation can have an average cross-sectional length of about 0.1 about 1 about 10 about 50 about 75 about 0.1 mm or more, about 0.5 mm or more, about 1 mm or more, about 1.5 mm or more, about 2 mm or more, about 2.5 mm or more, about 3 mm or more, about 3.5 mm or more, about 4 mm or more, about 4.5 mm or more, about 5 mm or more, about 5.5 mm or more, or about 6 mm or more. The particles after drying, after pyrolysis, and/or after activation can have an average cross-sectional length from a low of about 0.1 mm, about 0.5 mm, about 1 mm, about 1.5 mm, about 2 mm, about 2.5 mm, about 3 mm, about 3.5 mm, or about 4 mm to a high of about 5 mm, about 7 mm, about 10 mm, about 12 mm, about 15 mm, about 18 mm, about 20 mm, about 25 mm, or about 30 mm. In one or more embodiments, the particles after drying, after pyrolyzing, and/or after activation can have an average cross-sectional length from a low of about 1 about 10 about 50 about 100 about 200 about 300 about 500 about 700 or about 1,000 µm to a high of about 1.1 mm, about 1.3 mm, about 1.5 mm, about 2 mm, about 3 mm, about 4 mm, about 5 mm, about 7 mm, or about 10 mm.

If a modifier is used in making the wet gel, the modifier can be incorporated within the pore structure and/or on the surface of the particles after drying, after pyrolysis, and/or after activation or incorporated in any number of other ways. For example, in some embodiments, the particles after drying, after pyrolysis, and/or after activation can include a coating of the modifier at least partially on the surface thereof. In some embodiments, the particles after drying, after pyrolysis, and/or after activation can include greater than 100 ppm of a modifier.

The properties of the particles after drying, after pyrolysis, and/or after activation can be modified, at least in part, by the amount of the modifier in the particles after drying, after pyrolysis, and/or after activation. Accordingly, in some embodiments, the particles after drying, after pyrolysis, and/or after activation can include at least 0.1%, at least 0.25%, at least 0.5%, at least 1%, at least 5%, at least 10%, at least 25%, at least 50%, at least 75%, at least 90%, at least 95%, at least 99% or at least 99.5% of the modifier. For example, in some embodiments, the particles after drying, after pyrolysis, and/or after activation can include from about 0.5% and 99.5% carbon and from about 0.5% and 99.5% modifier. The percent of the modifier is calculated on weight percent basis (wt %). In some other more specific embodiments, the modifier can be selected from iron, tin, silicon, nickel and manganese.

The total ash content of the particles after drying, after pyrolysis, and/or after activation may, in some instances, can have an effect on the performance of the particles after drying, after pyrolysis, and/or after activation. Accordingly, in some embodiments, the ash content of the particles after drying, after pyrolysis, and/or after activation can be from about 0.1% to about 0.001% weight percent ash. For example in some specific embodiments the ash content of the particles after drying, after pyrolysis, and/or after activation can be less than 0.1%, less than 0.08%, less than 0.05%, less than 0.03%, than 0.025%, less than 0.01%, less than 0.0075%, less than 0.005% or less than 0.001%.

"Ash content" refers to the nonvolatile inorganic matter which remains after subjecting a substance to a high decomposition temperature. Herein, the ash content of a carbon material, e.g., the polymer particles after drying, after pyrolysis, and/or after activation, can be calculated from the total PIXE impurity content as measured by proton induced x-ray emission, assuming that nonvolatile elements are completely converted to expected combustion products (e.g., oxides). "Carbon material" refers to a material or substance composed substantially of carbon (e.g., greater than 90%, greater than 95%, greater than 99%, or greater than 99.9% carbon on a weight basis). Carbon materials include ultrapure as well as amorphous and crystalline carbon materials. Examples of carbon materials can include, but are not limited to, activated carbon, pyrolized dried polymer gels, pyrolized polymer cryogels, pyrolized polymer xerogels, pyrolized polymer aerogels, activated dried polymer gels, activated polymer cryogels, activated polymer xerogels, activated polymer aerogels, and the like.

Depending, at least in part, on the end use of the wet gel, the wet gel itself, the dried gel, the gel after pyrolyzing, the gel after activation, or a combination of wet gel, dried gel, pyrolized carbon product, and/or activated carbon product can be used in one or more applications. Illustrative applications the wet gel, dried gel, pyrolized carbon product, and/or activated carbon product can be used in can include, but are not limited to, insulation, energy such as in capacitors, batteries, and fuel cells, medicine such as in drug delivery, transportation such as in hydrogen or other fuel storage, sensors, sports, catalysts, hazardous waste water treatment, catalyst supports, sorbents, dielectrics, impedance matcher, detectors, filtrations, ion exchange, high-energy physics applications, waste management, such as adsorption of waste fluids and/or waste gases, and the like. As such, the wet gel, the dried gel, pyrolized carbon product, the activated carbon product, or a combination of the wet gel, the dried gel, the pyrolized carbon product, and/or the activated carbon product can be used alone and/or as a component of a system, device, or other structure.

One end use for the wet gel, dried gel, pyrolized carbon product, and/or activated carbon product can include incorporation of the dried gel into and/or on a composite wood product. Illustrative composite wood products can include, but are not limited to, particleboard, fiberboard such as medium density fiberboard ("MDF") and/or high density fiberboard ("HDF"), waferboard, oriented strand board plywood ("OSB"), plywood, laminated veneer lumber ("LVL"), laminated veneer boards ("LVB"), engineered wood flooring, and the like.

Another end use for the wet gel, dried gel, pyrolized carbon product, and/or activated carbon product can include incorporation of the dried gel into and/or on a fiberglass product. As used herein, the terms "fiber," "fibrous," "fiberglass," "fiber glass," "glass fibers," and the like are used interchangeably and refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination or mixture thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

Fiberglass products can be used by themselves or incorporated into a variety of products. For example, fiberglass products can be used as or incorporated into insulation batts or rolls, composite flooring, asphalt roofing shingles, siding, gypsum wall board, roving, microglass-based substrate for printed circuit boards, battery separators, filter stock, tape stock, carpet backing, commercial and industrial insulation, and as reinforcement scrim in cementitious and non-cementitious coatings for masonry.

Incorporation of the wet gel, dried gel, pyrolized carbon product, and/or activated carbon product into and/or on a composite wood product and/or a fiberglass product can increase the thermal and/or acoustic insulation properties of the composite product. In one or more embodiments, the wet gel, dried gel, pyrolized carbon product, and/or activated carbon product can be adhered, glued, or otherwise affixed to one or more surfaces of a composite wood product or fiberglass product to provide a thermally and/or acoustically insulated product. In another example, the wet gel, dried gel, pyrolized carbon product, and/or activated carbon product can be sandwiched between two or more layers of wood substrates or fiberglass to produce a product containing the wet gel, dried gel, pyrolized carbon product, and/or activated carbon product. For example, in the context of plywood, a layer of the wet gel, dried gel, pyrolized carbon product, and/or activated carbon product can be sandwiched between two layers of veneer.

Any suitable adhesive can be used to bind the wet gel, dried gel, pyrolized carbon product, and/or activated carbon product to wood and/or fiberglass in making the product containing the dried gel. Illustrative adhesives can include, but are not limited to, isocyanate resin, aldehyde based resins such as urea-formaldehyde, phenol formaldehyde, melamine formaldehyde, phenol-urea-formaldehyde resin, resorcinol-formaldehyde resin, phenol-resorcinol-formaldehyde resin, and melamine-urea-formaldehyde resin, or any mixture thereof.

Incorporation of the wet gel, dried gel, pyrolized carbon product, and/or activated carbon product into and/or on a composite wood product and/or a fiberglass product can include affixing the wet gel, dried gel, pyrolized carbon product, and/or activated carbon product onto one or more sheets or layers of material. Illustrative sheets of material can include, but are not limited to, paper sheets, polymer sheets, paper/polymer sheets, or any mixture thereof. In another example, incorporation of the wet gel, dried gel, pyrolized carbon product, and/or activated carbon product into and/or on a composite wood product and/or a fiberglass product can include applying a layer or covering of material that contains the dried gel. For example, wet gel, dried gel, pyrolized carbon product, and/or activated carbon product particles can be sandwiched between two or more layers of the sheet of material. This sandwiched layer having at least a first outer layer and a second outer layer of the sheet material and a core layer of the wet gel, dried gel, pyrolized carbon product, and/or activated carbon product can be affixed to one or more outer surfaces of the composite wood product and/or the fiberglass product and/or incorporated into the composite wood product and/or the fiberglass product.

Another end use for the wet gel, dried gel, pyrolized carbon product, and/or activated carbon product can include incorporation of the dried gel into one or more liquids that can be used to coat a surface. For example, the wet gel, dried gel, pyrolized carbon product, and/or activated carbon product can be incorporated into a paint to provide a paint containing the dried gel. The paint can then be applied to a wall or to an exterior and/or interior side of a roof or any other surface to provide a coated surface containing the dried gel.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

For all examples (Ex. 1-15), a phenol-formaldehyde prepolymer was produced according to the following procedure. About 520 grams of phenol and about 465 grams of formaldehyde (50 wt % aqueous solution) were added to a reactor and heated to a temperature of about 55° C. About 16 grams of triethylamine was added to the reactor and the temperature of the mixture was increased to about 78° C. and reaction between the components of the mixture was continued until a viscosity of 60 centistokes was reached. The reaction mixture was cooled to about 55° C. and distilled to provide a water content of about 12%. The reaction mixture was further cooled to about 25° C. and named as prepolymer.

To the prepolymer the appropriate amounts of acetic acid, maleic anhydride, ethylene glycol, PEG-PPG-PEG copolymer, citric acid, and/or resorcinol were added to produce a reaction mixture. The amount of each component relative to one another in the reaction mixture is shown in Table 1 below. The reaction mixture was heated in a 10 liter glass reactor to about 85° C. for about 5 hours under agitation. The mixture was cooled to about 55° C. and transferred to two 2.5 gallon containers. The containers were sealed and placed in a heated oven at 70° C. for about 48 hours. The sealed containers were then heated to 90° C. for about 24 hours and cooled to provide the wet gel product.

TABLE 1

| | | | | | | | | | | | |
|---|---|---|---|---|---|---|---|---|---|---|---|
| | | | | | Wet-Gel Composition | | | | | | |
| Ex. | Phenol, wt % | Form., wt % | Acetic Acid, wt % | Maleic Anhy., wt % | Ethylene Glycol, wt % | PEG-PPG-PEG Copolymer, wt % | Citric Acid, wt % | Resorc., wt % | TEA, wt % | Water, wt % | F:P Molar Ratio |
| 1 | 19.1 | 8.53 | 60.98 | 2.74 | — | 4.57 | 1.22 | — | 0.57 | 2.29 | 1.4:1 |
| 2 | 24.09 | 10.76 | 53.85 | 2.31 | — | 3.08 | 2.31 | — | 0.72 | 2.88 | 1.4:1 |
| 3 | 23.82 | 10.64 | 53.20 | 4.94 | — | 3.04 | 0.76 | — | 0.71 | 3.60 | 1.4:1 |
| 4 | 27.72 | 12.38 | 53.10 | 2.65 | — | — | — | — | 0.83 | 3.32 | 1.4:1 |
| 5 | 19.76 | 8.83 | 63.09 | 0.63 | — | 4.73 | — | — | 0.59 | 2.37 | 1.4:1 |
| 6 | 20.47 | 9.14 | 65.36 | 0.65 | — | — | 1.31 | — | 0.61 | 2.46 | 1.4:1 |
| 7 | 36.21 | 16.17 | 34.68 | 5.20 | — | — | 2.31 | — | 1.09 | 4.34 | 1.4:1 |
| 8 | 20.74 | 9.26 | 66.23 | 0.66 | — | — | — | — | 0.62 | 2.49 | 1.4:1 |
| 9 | 20.01 | 8.94 | 63.90 | 2.88 | — | — | 1.28 | — | 0.60 | 2.39 | 1.4:1 |
| 10 | 15.82 | 7.07 | 70.71 | 1.52 | — | 2.02 | 0.51 | — | 0.47 | 1.88 | 1.4:1 |
| 11 | 18.79 | 8.39 | 30.00 | 5.00 | 10.00 | 10.00 | 10.00 | 5.00 | 0.56 | 2.25 | 2.5:1 |
| 12 | 18.47 | 8.25 | 68.74 | 1.77 | — | — | — | — | 0.55 | 2.22 | 1.4:1 |
| 13 | 40.71 | 18.19 | 30.00 | 5.00 | — | — | — | — | 1.22 | 4.88 | 2.5:1 |
| 14 | 42.04 | 18.78 | 26.85 | 6.04 | — | — | — | — | 1.26 | 5.03 | 1.4:1 |
| 15 | 31.32 | 13.99 | 30.00 | — | 10.00 | 10.00 | — | — | 0.94 | 3.75 | 2.5:1 |

The wet gels were dried in an air atmosphere at a temperature of about 200° C. for about 15 hours to produce dried gels. The specific surface area (SSA), pore volume (PV), and pore size (PSD) were measured for the dried gels in Examples 1-3 and 5-10. All of the dried gels in Examples 1-15 were pyrolized under a nitrogen atmosphere at a temperature of about 900° C. for about 2 hours to produce a pyrolized or carbon product. The specific surface area (SSA), pore volume (PV), and pore size (PSD) were measured for the pyrolized carbon products in Examples 1-15. The specific surface area (SSA), pore volume (PV), and pore size (PSD) for the dried gels and the pyrolized carbon products are shown in Table 2 below.

TABLE 2

| | Properties | | | | | |
|---|---|---|---|---|---|---|
| | Pyrolized Carbon Product Properties | | | Dried Gel Properties | | |
| Ex. | SSA, $m^2/g$ | PV, $cm^3/g$ | PSD, nm | SSA, $m^2/g$ | PV, $cm^3/g$ | PSD, nm |
| 1 | 473 | 1.38 | 90 | 145 | 0.72 | 50 |
| 2 | 424 | 0.93 | 30 | 167 | 0.77 | 25 |
| 3 | 496 | 0.91 | 48 | 167 | 0.91 | 50 |
| 4 | 380 | 0.85 | 50 | — | — | — |
| 5 | 428 | 0.66 | 90 | 97 | 0.39 | 85 |
| 6 | 426 | 0.56 | 90 | 87 | 0.41 | 90 |
| 7 | 389 | 0.51 | 15 | 270 | 0.59 | 18 |
| 8 | 404 | 0.47 | 90 | 91 | 0.40 | 90 |
| 9 | 460 | 0.41 | 40 | 100 | 0.31 | 90 |
| 10 | 485 | 0.41 | 90 | 47 | 0.16 | 90 |
| 11 | 318 | 0.39 | 20 | — | — | — |
| 12 | 488 | 0.39 | 35 | — | — | — |
| 13 | 335 | 0.38 | 25 | — | — | — |
| 14 | 342 | 0.36 | 15 | — | — | — |
| 15 | 142 | 0.1 | 80 | — | — | — |

As shown in Table 2 above, the physical properties of the dried gels and the pyrolized carbon products could be adjusted or tailored based on the particular composition of the reaction mixture. For example, under some conditions increasing acetic acid increased the pore size, pore volume, and specific surface area.

Example II

A wet gel was made and pyrolized to produce a pyrolized carbon product composed of carbon (Ex. 16). A prepolymer was made according to Example I above. To about 200 grams of the prepolymer, a mixture of about 6 grams resorcinol, about 6 grams maleic anhydride, about 10 grams citric acid, about 10 grams poly(ethylene glycol)-poly(propylene glycol)-poly(ethylene glycol) block polymer, about 50 grams acetic acid, and about 50 grams ethylene glycol was added. The mixture was placed into a container, sealed, and heated in an oven at about 90° C. for about 43 hours. The resulting wet gel was then placed in a tube furnace and pyrolized under a nitrogen atmosphere at a temperature of about 900° C. for about 2 hours. The pore volume of the resulting pyrolized carbon product was about 0.25 $cm^3/g$ and the pore size distribution was about 20 nm.

Example III

A wet gel containing silicon powder was made and pyrolized to produce a pyrolized carbon product composed of silicon carbide (Ex. 17). A prepolymer was made according to Example I above. To about 200 grams of the prepolymer, a mixture of about 6 grams resorcinol, about 6 grams maleic anhydride, about 10 grams citric acid, about 10 grams poly(ethylene glycol)-poly(propylene glycol)-poly(ethylene glycol) block polymer, about 50 grams acetic acid, about 50 grams ethylene glycol, and about 280 grams silicon powder was added. The mixture was then placed into a container, sealed, and heated in an oven at a temperature of about 90° C. for about 43 hours. The resulting wet gel were then placed in a tube furnace and pyrolized under a nitrogen atmosphere at a temperature of about 1,050° C. for about 2 hours to produce a silicon carbide gel. The pore volume of the silicon carbide product was about 0.20 $cm^3/g$ and the pore size distribution was centered on about 50 nm.

Embodiments of the present disclosure further relate to any one or more of the following paragraphs:

1. A method for making a wet gel, comprising: combining at least one hydroxybenzene compound, at least one aldehyde compound, and at least one additive comprising a carboxylic acid, an anhydride, a homopolymer, a copolymer, or any mixture thereof to produce a reaction mixture; and reacting at least the hydroxybenzene compound and the aldehyde compound to produce a wet gel, wherein the reaction mixture comprises about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer, wherein the reaction mixture comprises about 10 wt % to about 90 wt % of the additive, and wherein all weight percent values are based on the combined weight of the hydroxybenzene compound, the aldehyde compound, and the additive.

2. A method for making a dried gel, comprising: combining at least one solvent, at least one hydroxybenzene compound, at least one aldehyde compound, and at least one additive comprising a carboxylic acid, an anhydride, a homopolymer, a copolymer, or any mixture thereof to produce a reaction mixture; reacting at least the hydroxybenzene compound and the aldehyde compound to produce a wet gel; and drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$.

3. A method for making a dried gel, comprising: determining one or more desired properties of a dried gel selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$; combining a solvent, at least one hydroxybenzene compound, at least one aldehyde compound, and at least one additive comprising a carboxylic acid, an anhydride, a homopolymer, a copolymer, or any a mixture thereof to produce a reaction mixture; reacting at least the hydroxybenzene compound and the aldehyde compound to produce a wet gel; and drying the wet gel to produce a dried gel, wherein a pressure exerted on the wet gel during drying is maintained below a critical pressure of the solvent, and wherein the amount of the hydroxybenzene compound, the amount of the aldehyde compound, and the amount of the additive are controlled to produce the dried gel having the one or more desired properties.

4. A method for making a dried gel, comprising: reacting at least one hydroxybenzene compound and at least one aldehyde compound to produce a wet gel; and drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$.

5. A method for making a dried gel, comprising: reacting phenol and formaldehyde with one another to produce a wet gel; and drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$.

6. The method according to any one of paragraphs 1 to 5, wherein the reaction mixture comprises about 15 wt % to about 90 wt % of the additive, based on the combined weight of the hydroxybenzene compound, the aldehyde compound, and the additive.

7. The method according to any one of paragraphs 1 to 6, wherein reaction mixture comprises about 20 wt % to about 90 wt % of the additive, based on the combined weight of the hydroxybenzene compound, the aldehyde compound, and the additive.

8. The method according to any one of paragraphs 1 to 7, wherein reaction mixture comprises about 25 wt % to about 90 wt % of the additive, based on the combined weight of the hydroxybenzene compound, the aldehyde compound, and the additive.

9. The method according to any one of paragraphs 1 to 8, wherein reaction mixture comprises about 30 wt % to about 90 wt % of the additive, based on the combined weight of the hydroxybenzene compound, the aldehyde compound, and the additive.

10. The method according to any one of paragraphs 1 to 9, wherein reaction mixture comprises about 35 wt % to about 90 wt % of the additive, based on the combined weight of the hydroxybenzene compound, the aldehyde compound, and the additive.

11. The method according to any one of paragraphs 1 to 10, wherein the reaction mixture comprises about 20 wt % to about 75 wt % of the hydroxybenzene and the aldehyde compound, based on the combined weight of the hydroxybenzene compound, the aldehyde compound, and the additive.

12. The method according to any one of paragraphs 1 to 11, wherein the reaction mixture comprises about 25 wt % to about 70 wt % of the carboxylic acid, based on the combined weight of the hydroxybenzene compound, the aldehyde compound, and the additive.

13. The method according to any one of paragraphs 1 to 12, wherein the reaction mixture comprises about 30 wt % to about 65 wt % of the carboxylic acid, based on the combined weight of the hydroxybenzene compound, the aldehyde compound, and the additive.

14. The method according to any one of paragraphs 1 to 13, wherein the reaction mixture comprises about 0.5 wt % to about 10 wt % of the anhydride, based on the combined weight of the hydroxybenzene compound, the aldehyde compound, and the additive.

15. The method according to any one of paragraphs 1 to 14, wherein the reaction mixture comprises about 0.5 wt % to about 10 wt % of the homopolymer, based on the combined weight of the hydroxybenzene compound, the aldehyde compound, and the additive.

16. The method according to any one of paragraphs 1 to 15, wherein the reaction mixture comprises about 1 wt % to about 10 wt % of the copolymer, based on the combined weight of the hydroxybenzene compound, the aldehyde compound, and the additive.

17. The method according to any one of paragraphs 1 to 16, wherein the reaction mixture comprises about 30 wt % to about 70 wt % of the carboxylic acid, about 0.1 wt % to about 10 wt % of the anhydride, and about 0.1 wt % to about 8 wt % of the copolymer, based on the combined weight of the hydroxybenzene compound, the aldehyde compound, and the additive.

18. The method according to any one of paragraphs 1 to 17, wherein the reaction mixture comprises about 30 wt % to about 70 wt % of the carboxylic acid and about 0.1 wt % to about 8 wt % of the copolymer, based on the combined weight of the hydroxybenzene compound, the aldehyde compound, and the additive.

19. The method according to any one of paragraphs 1 to 18, wherein the reaction mixture comprises about 30 wt % to about 70 wt % of the carboxylic acid and about 0.1 wt % to about 8 wt % of the anhydride, based on the combined weight of the hydroxybenzene compound, the aldehyde compound, and the additive.

20. The method according to any one of paragraphs 1 to 4 or 6 to 19, wherein the hydroxybenzene compound comprises phenol, resorcinol, cresol, catechol, hydroquinone, phloroglucinol, or any mixture thereof.

21. The method according to any one of paragraphs 1 to 4 or 6 to 20, wherein the aldehyde compound comprises formaldehyde, acetaldehyde, propionaldehyde, butyraldehyde, furfuraldehyde, glucose, benzaldehyde, cinnamaldehyde, or any mixture thereof.

22. The method according to any one of paragraphs 1 to 21, wherein the additive comprises the carboxylic acid.

23. The method according to any one of paragraphs 1 to 22, wherein the additive comprises the carboxylic acid, and wherein the carboxylic acid comprises a monocarboxylic acid, a dicarboxylic acid, or a tricarboxylic acid.

24. The method according to any one of paragraphs 1 to 23, wherein the additive comprises the carboxylic acid, and wherein the carboxylic acid comprises formic acid, acetic acid, maleic acid, or any mixture thereof.

25. The method according to any one of paragraphs 1 to 24, wherein the additive comprises the anhydride.

26. The method according to any one of paragraphs 1 to 25, wherein the additive comprises the anhydride, and wherein the anhydride comprises maleic anhydride, 1,2,4-benzenetricarboxylic anhydride, phthalic anhydride, succinic anhydride, or any mixture thereof.

27. The method according to any one of paragraphs 1 to 26, wherein the additive comprises the homopolymer.

28. The method according to any one of paragraphs 1 to 27, wherein the additive comprises the homopolymer, and wherein the homopolymer comprises polyethylene, polypropylene, polystyrene, polyvinylchloride, or any mixture thereof.

29. The method according to any one of paragraphs 1 to 28, wherein the additive comprises the copolymer.

30. The method according to any one of paragraphs 1 to 29, wherein the additive comprises the copolymer, and wherein the copolymer comprises an alternating copolymer, a periodic copolymer, a statistical copolymer, a terpolymer, a block copolymer, a linear copolymer, a branched copolymer, or any mixture thereof.

31. The method according to paragraph 30, wherein the additive comprises the alternating copolymer, and wherein the alternating comprises poly[styrene-alt-(maleic anhydride)], poly[(ethylene glycol)-alt-(terephthalic acid; isophthalic acid)], or a mixture thereof.

32. The method according to paragraph 30 or 31, wherein the additive comprises the periodic copolymer, and wherein the periodic copolymer comprises poly(1,3,6-trioxacyclooctane) poly(oxymethyleneoxyethyleneoxyethylene).

33. The method according to anyone of paragraphs 30 to 32, wherein the additive comprises the terpolymer, and wherein the terpolymer comprises acrylonitrile-butadiene-styrene.

34. The method according to anyone of paragraphs 30 to 33, wherein the additive comprises the statistical copolymer, and wherein the statistical copolymer comprises poly(styrene-stat-acrylonitrile-stat-butadiene), poly[(6-aminohexanoic acid)-stat-(7-aminoheptanoic acid)], poly[(4-hydroxybenzoic acid)-co-hydroquinone-co-(terephthalic acid)], poly[styrene-co-(methyl methacrylate)], or any mixture thereof.

35. The method according to anyone of paragraphs 30 to 34, wherein the additive comprises the block copolymer, and wherein the block copolymer comprises polystyrene-block-polybutadiene-block-polystyrene, poly(ethylene glycol)-poly(propylene glycol)-poly(ethylene glycol) block polymer, poly[poly(methyl methacrylate)-block-polystyrene-block-poly(methyl acrylate)], or any mixture thereof.

36. The method according to anyone of paragraphs 30 to 35, wherein the additive comprises the linear copolymer, and wherein the linear copolymer comprises a copolymer of ethylene and one or more C3 to C20 alpha olefin comonomers.

37. The method according to anyone of paragraphs 30 to 36, wherein the additive comprises the branched copolymer, and wherein branched copolymer comprises a branched methacrylate copolymer.

38. The method according to anyone of paragraphs 1 to 4 or 6 to 37, wherein at least a portion of the hydroxybenzene compound and at least a portion of the aldehyde compound are reacted with one another to form a prepolymer, and wherein the prepolymer is further reacted in the presence of the additive to produce the wet gel.

39. The method according to anyone of paragraphs 1 to 4 or 6 to 38, wherein at least a portion of the hydroxybenzene compound and at least a portion of the aldehyde compound are reacted with one another to form a prepolymer having a refractive index of about 1.1000 to about 1.7000, and wherein the prepolymer is further reacted in the presence of the additive to produce the wet gel.

40. The method according to anyone of paragraphs 1 to 4 or 6 to 39, wherein at least a portion of the hydroxybenzene compound and at least a portion of the aldehyde compound are reacted with one another to form a prepolymer, and wherein the prepolymer is further reacted with the additive to produce the wet gel.

41. The method according to anyone of paragraphs 1 to 4 or 6 to 40, further comprising combining at least one solvent with the hydroxybenzene compound, the aldehyde compound, and the additive to produce the reaction mixture.

42. The method according to paragraph 41, wherein the solvent comprises water.

43. The method according to anyone of paragraphs 1 to 4 or 6 to 42, further comprising combining at least one polyol with the hydroxybenzene compound, the aldehyde compound, and the additive to produce the reaction mixture.

44. The method according to paragraph 43, wherein the polyol comprises ethylene glycol.

45. The method according to paragraph 43 or 44, wherein the reaction mixture comprises about 0.1 wt % to about 40 wt % of the polyol, based on the combined weight of the hydroxybenzene compound, the aldehyde compound, the additive, and the polyol.

46. The method according to anyone of paragraphs 1 to 4 or 6 to 45, further comprising combining at least one modifier with the at least one hydroxybenzene compound, the at least one aldehyde compound, and the at least one additive comprising the carboxylic acid, the anhydride, the homopolymer, the copolymer, or any mixture thereof to produce the reaction mixture.

47. The method according to paragraph 46, wherein the modifier comprises lead, tin, antimony, bismuth, arsenic, tungsten, silver, zinc, cadmium, indium, silicon, iron, sulfur, cobalt, nickel, bromine, chlorine, ruthenium, rhodium, platinum, palladium, zirconium, gold, oxides thereof, or any mixture thereof.

48. The method according to paragraph 46, wherein the at least one modifier comprises silicon.

49. The method according to paragraph 46, wherein the reaction mixture comprises about 0.1 wt % to about 95 wt % of the modifier, based on the combined weight of the hydroxybenzene compound, the aldehyde compound, the additive, and the modifier.

50. The method according to any one of paragraphs 2 to 49, wherein the solvent comprises water.

51. The method according to any one of paragraphs 2 to 50, wherein the pressure exerted on the wet gel during drying is atmospheric pressure.

52. The method according to any one of paragraphs 2 to 50, wherein the pressure exerted on the wet gel during drying is maintained at or below atmospheric pressure.

53. The method according to any one of paragraphs 2 to 52, wherein the dried gel has an average pore size of about 10 nm to about 150 nm.

54. The method according to any one of paragraphs 2 to 53, wherein the dried gel has an average pore size of about 51 nm to about 150 nm.

55. The method according to any one of paragraphs 2 to 54, wherein the dried gel has a specific surface area of about 5 $m^2/g$ to about 1,500 $m^2/g$.

56. The method according to any one of paragraphs 2 to 55, wherein the dried gel has a specific surface area of about 300 $m^2/g$ to about 1,000 $m^2/g$.

57. The method according to any one of paragraphs 2 to 56, wherein the dried gel has a pore volume of about 0.2 $cm^3/g$ to about 2.5 $cm^3/g$.

58. The method according to any one of paragraphs 2 to 57, wherein the dried gel has a pore volume of about 0.35 $cm^3/g$ to about 2 $cm^3/g$.

59. The method according to any one of paragraphs 1 or 6 to 58, further comprising drying the wet gel to produce a dried gel.

60. The method according to any one of paragraphs 1 or 6 to 58, further comprising drying the wet gel to produce a dried gel, wherein a pressure exerted on the wet gel during drying is maintained below a critical pressure of the solvent.

61. The method according to any one of paragraphs 1 or 6 to 58, further comprising drying the wet gel to produce a dried gel, wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$.

62. The method according to any one of paragraphs 1 or 6 to 58, further comprising drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$.

63. The method according to any one of paragraphs 2 to 62, further comprising heating the dried gel to a temperature sufficient to produce a pyrolized carbon product.

64. The method according to any one of paragraphs 2 to 62, further comprising heating the dried gel to a temperature of about 500° C. to about 2,400° C. to produce a pyrolized carbon product.

65. The method according to any one of paragraphs 1 to 62, further comprising heating the wet gel or the dried gel in an inert atmosphere at a temperature of about 500° C. to about 2,400° C. to produce a pyrolized carbon product.

66. The method according to any one of paragraphs 1 to 65, further comprising heating the wet gel, the dried gel, or the pyrolized carbon product in an atmosphere comprising carbon dioxide, carbon monoxide, steam, oxygen, or any mixture thereof at a temperature of about 500° C. to about 1,300° C. to produce an activated carbon product.

67. A method for making a pyrolized carbon particle, comprising: combining a hydroxybenzene compound, an aldehyde compound, and an additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel, wherein the reaction mixture comprises about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer, wherein the reaction mixture comprises about 10 wt % to about 90 wt % of the additive, and wherein all weight percent values are based on the combined weight of the hydroxybenzene compound, the aldehyde compound, and the additive; and heating the wet gel to produce a pyrolized carbon product.

68. A method for making a pyrolized carbon particle, comprising: combining at least one solvent, at least one hydroxybenzene compound, at least one aldehyde compound, and at least one additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel; drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 $m^2/g$ to about 1,500 $m^2/g$, and a pore volume of about 0.2 $cm^3/g$ to about 2.5 $cm^3/g$; and heating the dried gel to produce a pyrolized carbon product.

69. A method for making a pyrolized carbon product, comprising: reacting at least one hydroxybenzene compound and at least one aldehyde compound to produce a wet gel; drying the wet gel to produce a dried gel, wherein a pressure exerted on the wet gel during drying is maintained below a critical pressure of the solvent; and heating the dried gel to produce a pyrolized carbon product.

70. A method for making a pyrolized carbon product, comprising: reacting phenol and formaldehyde with one another to produce a wet gel; drying the wet gel to produce a dried gel, wherein a pressure exerted on the wet gel during drying is maintained below a critical pressure of the solvent, and heating the dried gel to produce a pyrolized carbon product.

71. A method for making a pyrolized carbon product, comprising: reacting phenol and formaldehyde with one another to produce a wet gel; and heating the wet gel to produce a pyrolized carbon product.

72. The method according to any one of paragraphs 67 to 71, wherein the wet gel, the dried gel, or the pyrolized carbon product is heated in an atmosphere comprising carbon dioxide, carbon monoxide, steam, oxygen, or any mixture thereof at a temperature of about 500° C. to about 2,500° C. to produce an activated carbon product.

73. The method according to any one of paragraphs 67 to 72, wherein the pyrolized carbon product has a pore volume of about 0.03 $cm^3/g$ to about 2.5 $cm^3/g$.

74. The method according to any one of paragraphs 67 to 73, wherein the pyrolized carbon product has a pore volume of about 0.3 $cm^3/g$ to about 1.4 $cm^3/g$.

75. The method according to any one of paragraphs 67 to 74, wherein the pyrolized carbon product has a pore size of about 1 nm to about 500 nm.

76. The method according to any one of paragraphs 67 to 75, wherein the pyrolized carbon product has a pore size of about 15 nm to about 90 nm.

77. The method according to any one of paragraphs 67 to 76, wherein the pyrolized carbon product has a specific surface area of about 5 m$^2$/g to about 1,500 m$^2$/g.

78. The method according to any one of paragraphs 67 to 77, wherein the pyrolized carbon product has a specific surface area of about 140 m$^2$/g to about 500 m$^2$/g.

79. The method according to any one of paragraphs 67 to 78, wherein the pyrolized carbon product has a pore size of about 10 nm to about 100 nm and a pore volume of about 0.2 cm$^3$/g to about 2 cm$^3$/g.

80. The method according to any one of paragraphs 67 to 79, wherein the pyrolized carbon product has a pore size of about 10 nm to about 100 nm and a specific surface area of about 5 m$^2$/g to about 1,500 m$^2$/g.

81. The method according to any one of paragraphs 67 to 80, wherein the pyrolized carbon product has a pore size of about 10 nm to about 100 nm, a specific surface area of about 5 m$^2$/g to about 1,500 m$^2$/g, and a pore volume of about 0.2 cm$^3$/g to about 2 cm$^3$/g.

82. A carbon material comprising a pyrolized carbon product or an activated carbon product, wherein the carbon material has at least two of: a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

83. A carbon material comprising a pyrolized carbon product or an activated carbon product, wherein the carbon material has at least two of: a pore volume of about 0.3 cm$^3$/g to about 1.4 cm$^3$/g, a pore size of about 15 nm to about 90 nm, and a specific surface area of about 140 m$^2$/g to about 500 m$^2$/g.

84. A carbon material comprising a pyrolized carbon product or an activated carbon product, wherein the carbon material has a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

85. A carbon material comprising a pyrolized carbon product or an activated carbon product, wherein the carbon material has a pore volume of about 0.3 cm$^3$/g to about 1.4 cm$^3$/g, a pore size of about 15 nm to about 90 nm, and a specific surface area of about 140 m$^2$/g to about 500 m$^2$/g.

86. A method for making an activated carbon particle, comprising: combining a hydroxybenzene compound, an aldehyde compound, and an additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel, wherein the reaction mixture comprises about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer, wherein the reaction mixture comprises about 10 wt % to about 90 wt % of the additive, and wherein all weight percent values are based on the combined weight of the hydroxybenzene compound, the aldehyde compound, and the additive; and heating the wet gel in an atmosphere comprising carbon dioxide, carbon monoxide, steam, oxygen, or any mixture thereof at a temperature of about 500° C. to about 2,500° C. to produce an activated carbon product.

87. A method for making an activated carbon particle, comprising: combining at least one solvent, at least one hydroxybenzene compound, at least one aldehyde compound, and at least one additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel; drying the wet gel to produce a dried gel, wherein a pressure exerted on the wet gel during drying is maintained below a critical pressure of the solvent; and heating the dried gel in an atmosphere comprising carbon dioxide, carbon monoxide, steam, oxygen, or any mixture thereof at a temperature of about 500° C. to about 2,500° C. to produce an activated carbon product.

88. The method according to paragraph 87, wherein the activated carbon product has at least one property selected from the group consisting of: an average pore size of about 10 nm to about 150 nm, a specific surface area of about 5 m$^2$/g to about 1,500 m$^2$/g, and a pore volume of about 0.2 cm$^3$/g to about 2.5 cm$^3$/g.

89. A method for making an activated carbon particle, comprising: reacting at least one hydroxybenzene compound and at least one aldehyde compound to produce a wet gel; drying the wet gel to produce a dried gel, wherein a pressure exerted on the wet gel during drying is maintained below a critical pressure of the solvent; and heating the dried gel under conditions sufficient to produce an activated carbon product.

90. The method according to paragraph 89, wherein the dried gel is heated in an atmosphere comprising carbon dioxide, carbon monoxide, steam, oxygen, or any mixture thereof at a temperature of about 500° C. to about 2,500° C. to produce the activated carbon product.

91. A method for making a wet gel, comprising: combining a hydroxybenzene compound, an aldehyde compound, and an additive to produce a reaction mixture, wherein the additive comprises a carboxylic acid, an anhydride, a homopolymer, a copolymer, or any mixture thereof; and reacting at least the hydroxybenzene compound and the aldehyde compound to produce a wet gel, wherein the reaction mixture comprises about 10 wt % to about 65 wt % of the hydroxybenzene compound, about 5 wt % to about 25 wt % of the aldehyde compound, up to about 85 wt % of the carboxylic acid, up to about 40 wt % of the anhydride, up to about 40 wt % of the homopolymer, and up to about 40 wt % of the copolymer, wherein the reaction mixture comprises about 10 wt % to about 90 wt % of the additive, and wherein all weight percent values are based on the combined weight of the hydroxybenzene compound, the aldehyde compound, and the additive.

92. A method for making a dried gel, comprising: combining a solvent, a hydroxybenzene compound, an aldehyde compound, and an additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel; and drying the wet gel to produce a dried gel, wherein a pressure exerted on the wet gel during drying is maintained below a critical pressure of the solvent, and wherein the dried gel has at least one property selected from the group consisting of: an average pore size of about 10 nm to about 150 nm, a specific surface area of about 5 m²/g to about 1,500 m²/g, and a pore volume of about 0.2 cm³/g to about 2.5 cm³/g.

93. A method for making a dried gel, comprising: determining one or more desired properties of a dried gel selected from the group consisting of: an average pore size of about 10 nm to about 150 nm, a specific surface area of about 5 m²/g to about 1,500 m²/g, and a pore volume of about 0.2 cm³/g to about 2.5 cm³/g; combining a solvent, a hydroxybenzene compound, an aldehyde compound, and an additive to produce a reaction mixture, wherein the additive comprises a carboxylic acid, an anhydride, a homopolymer, a copolymer, or any mixture thereof; reacting at least the hydroxybenzene compound and the aldehyde compound to produce a wet gel; and drying the wet gel to produce a dried gel, wherein a pressure exerted on the wet gel during drying is maintained below a critical pressure of the solvent, and wherein the amount of the hydroxybenzene compound, the amount of the aldehyde compound, and the amount of the additive are controlled to produce the dried gel having the one or more desired properties.

94. The method according to any one of paragraphs 67, 68, or 91 to 93, wherein the reaction mixture comprises about 25 wt % to about 90 wt % of the additive, based on the combined weight of the hydroxybenzene compound, the aldehyde compound, and the additive.

95. The method according to any one of paragraphs 67, 68, or 91 to 94, wherein the reaction mixture comprises about 25 wt %, about 30 wt %, or about 35 wt % to about 50 wt %, about 60 wt %, about 70 wt %, about 80 wt %, or about 90 wt % of the additive, based on the combined weight of the hydroxybenzene compound, the aldehyde compound, and the additive.

96. The method according to any one of paragraphs 67, 68, or 91 to 95, wherein the reaction mixture comprises about 25 wt % to about 70 wt % of the carboxylic acid, based on the combined weight of the hydroxybenzene compound, the aldehyde compound, and the additive.

97. The method according to any one of paragraphs 67, 68, or 91 to 96, wherein the reaction mixture comprises about 0.5 wt % to about 10 wt % of the anhydride, based on the combined weight of the hydroxybenzene compound, the aldehyde compound, and the additive.

98. The method according to any one of paragraphs 67, 68, or 91 to 97, wherein the reaction mixture comprises about 0.5 wt % to about 10 wt % of the homopolymer, based on the combined weight of the hydroxybenzene compound, the aldehyde compound, and the additive.

99. The method according to any one of paragraphs 67, 68, or 91 to 98, wherein the reaction mixture comprises about 1 wt % to about 10 wt % of the copolymer, based on the combined weight of the hydroxybenzene compound, the aldehyde compound, and the additive.

100. The method according to any one of paragraphs 67, 68, or 91 to 99, wherein the reaction mixture comprises about 30 wt % to about 70 wt % of the carboxylic acid, about 0.1 wt % to about 10 wt % of the anhydride, and about 0.1 wt % to about 8 wt % of the copolymer, based on the combined weight of the hydroxybenzene compound, the aldehyde compound, and the additive.

101. The method according to any one of paragraphs 67, 68, or 91 to 100, wherein the additive comprises the copolymer, and wherein the copolymer comprises an alternating copolymer, a periodic copolymer, a statistical copolymer, a terpolymer, a block copolymer, a linear copolymer, a branched copolymer, or any mixture thereof.

102. The method according to any one of paragraphs 67, 68, or 91 to 101, wherein at least a portion of the hydroxybenzene compound and at least a portion of the aldehyde compound are reacted with one another to form a prepolymer, and wherein the prepolymer is reacted in the presence of the additive to produce the wet gel.

103. The method according to any one of paragraphs 67, 68, or 91 to 102, wherein at least a portion of the hydroxybenzene compound and at least a portion of the aldehyde compound are reacted with one another to form a prepolymer, and wherein the prepolymer is reacted with the additive to produce the wet gel.

104. The method according to any one of paragraphs 67, 68, or 91 to 103, further comprising combining at least one polyol with the hydroxybenzene compound, the aldehyde compound, and the additive to produce the reaction mixture, wherein the reaction mixture comprises about 0.1 wt % to about 40 wt % of the polyol, based on the combined weight of the hydroxybenzene compound, the aldehyde compound, the additive, and the polyol.

105. The method according to any one of paragraphs 67, 68, or 91 to 104, further comprising combining at least one modifier with the hydroxybenzene compound, the aldehyde compound, and the additive to produce the reaction mixture, wherein the modifier comprises lead, tin, antimony, bismuth, arsenic, tungsten, silver, zinc, cadmium, indium, silicon, iron, sulfur, cobalt, nickel, bromine, chlorine, ruthenium, rhodium, platinum, palladium, zirconium, gold, oxides thereof, or any mixture thereof, and wherein the reaction mixture comprises about 0.1 wt % to about 95 wt % of the modifier, based on the combined weight of the hydroxybenzene compound, the aldehyde compound, the additive, and the modifier.

106. The method according to any one of paragraphs 91 to 105, further comprising drying the wet gel to produce a dried gel.

107. The method according to any one of paragraphs 91 to 106, further comprising drying the wet gel to produce a dried gel, wherein the dried gel has at least one property selected from the group consisting of: an average pore size of about 10 nm to about 150 nm, a specific surface area of about 5 m²/g to about 1,500 m²/g, and a pore volume of about 0.2 cm³/g to about 2.5 cm³/g.

108. The method according to any one of paragraphs 91 to 107, further comprising combining at least one solvent with the hydroxybenzene compound, the aldehyde compound, and the additive to produce the reaction mixture; and drying the wet gel to produce a dried gel, wherein a pressure exerted on the wet gel during drying is maintained below a critical pressure of the solvent.

109. The method according to any one of paragraphs 91 to 108, wherein the dried gel has at least one property selected from the group consisting of: an average pore size of about 10 nm to about 150 nm, a specific surface area of about 5 m²/g to about 1,500 m²/g, and a pore volume of about 0.2 cm³/g to about 2.5 cm³/g.

110. The method according to any one of paragraphs 67, 68, or 91 to 109, wherein the hydroxybenzene compound comprises phenol, resorcinol, cresol, catechol, hydroquinone, phloroglucinol, or any mixture thereof, and wherein the aldehyde compound comprises formaldehyde, acetaldehyde, propionaldehyde, butyraldehyde, furfuraldehyde, glucose, benzaldehyde, cinnamaldehyde, or any mixture thereof.

111. The method according to any one of paragraphs 67, 68, or 91 to 110, wherein the hydroxybenzene compound comprises phenol, resorcinol, cresol, catechol, hydroquinone, phloroglucinol, or any mixture thereof, wherein the aldehyde compound comprises formaldehyde, acetaldehyde, propionaldehyde, butyraldehyde, furfuraldehyde, glucose, benzaldehyde, cinnamaldehyde, or any mixture thereof, and wherein the additive comprises acetic acid, citric acid, and maleic anhydride.

112. A pyrolized carbon product having at least two of: a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

113. A pyrolized carbon product having at least two of: a pore volume of about 0.3 cm$^3$/g to about 1.4 cm$^3$/g, a pore size of about 15 nm to about 90 nm, and a specific surface area of about 140 m$^2$/g to about 500 m$^2$/g.

114. A pyrolized carbon product having a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

115. A pyrolized carbon product having a pore volume of about 0.3 cm$^3$/g to about 1.4 cm$^3$/g, a pore size of about 15 nm to about 90 nm, and a specific surface area of about 140 m$^2$/g to about 500 m$^2$/g.

116. An activated carbon product having at least two of: a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

117. A activated carbon product having at least two of: a pore volume of about 0.3 cm$^3$/g to about 1.4 cm$^3$/g, a pore size of about 15 nm to about 90 nm, and a specific surface area of about 140 m$^2$/g to about 500 m$^2$/g.

118. A activated carbon product having a pore volume of about 0.03 cm$^3$/g to about 2.5 cm$^3$/g; a pore size of about 1 nm to about 500 nm; and a specific surface area of about 5 m$^2$/g to about 1,500 m$^2$/g.

119. A activated carbon product having a pore volume of about 0.3 cm$^3$/g to about 1.4 cm$^3$/g, a pore size of about 15 nm to about 90 nm, and a specific surface area of about 140 m$^2$/g to about 500 m$^2$/g.

120. The activated carbon product according to any one of paragraphs 116 to 119, wherein the activated carbon product is produced by heating a pyrolized carbon product in an atmosphere comprising carbon dioxide, carbon monoxide, steam, oxygen, or any mixture thereof to a temperature of about 500° C. to about 1,300° C.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for making a wet gel, comprising:
   mixing a hydroxybenzene compound, an aldehyde compound and an additive that comprises an anhydride to provide a reaction mixture;
   reacting at least the hydroxybenzene compound and the aldehyde compound in the reaction mixture to produce a wet gel, wherein the reaction mixture comprises about 10 wt % to about 65 wt % of the hydroxybenzene compound, about 5 wt % to about 25 wt % of the aldehyde compound, and up to about 40 wt % of the anhydride, based on the combined weight of the hydroxybenzene compound, the aldehyde compound, and the additive.

2. The process of claim 1, wherein the additive further comprises a carboxylic acid.

3. The process of claim 2, wherein the reaction mixture comprises about 25 wt % to about 75 wt % of the carboxylic acid, based on the combined weight of the hydroxybenzene compound, the aldehyde compound, and the additive.

4. The process of claim 3, wherein the reaction mixture comprises about 35 wt % to about 85 wt % of the additive, based on the combined weight of the hydroxybenzene compound, the aldehyde compound, and the additive.

5. The process of claim 1, wherein the reaction mixture comprises about 0.5 wt % to about 10 wt % of the anhydride, based on the combined weight of the hydroxybenzene compound, the aldehyde compound, and the additive.

6. The process of claim 1, wherein the additive further comprises a homopolymer, wherein the reaction mixture comprises about 0.5 wt % to about 10 wt % of the homopolymer, based on the combined weight of the hydroxybenzene compound, the aldehyde compound, and the additive, and wherein the homopolymer comprises polyethylene, polypropylene, polystyrene, polyvinylchloride, or a mixture thereof.

7. The process of claim 1, wherein the additive further comprises a copolymer, wherein the reaction mixture comprises about 1 wt % to about 10 wt % of the copolymer, based on the combined weight of the hydroxybenzene compound, the aldehyde compound, and the additive, and wherein the copolymer comprises poly[styrene-alt-(maleic anhydride)], poly[(ethylene glycol)-alt-(terephthalic acid; isophthalic acid)], poly(1,3,6-trioxacyclooctane) poly (oxymethyleneoxyethyleneoxyethylene), poly(styrene-stat-acrylonitrile-stat-butadiene), poly[(6-aminohexanoic acid)-stat-(7-aminoheptanoic acid)], poly[(4-hydroxybenzoic acid)-co-hydroquinone-co-(terephthalic acid)], poly[styrene-co-(methyl methacrylate)], acrylonitrile-butadiene-styrene terpolymer, polystyrene-block-polybutadiene-block-polystyrene, poly(ethylene glycol)-poly(propylene glycol)-poly(ethylene glycol) block polymer, poly[poly(methyl methacrylate)-block-polystyrene-block-poly(methyl acrylate)], a copolymer of ethylene and one or more $C_3$ to $C_{20}$ alpha olefin comonomers, a branched methacrylate copolymer, or a mixture thereof.

8. The process of claim 1, wherein the additive further comprises a carboxylic acid and a copolymer, and wherein the reaction mixture comprises about 0.1 wt % to about 10 wt % of the anhydride, about 30 wt % to about 70 wt % of the carboxylic acid, and about 0.1 wt % to about 8 wt % of the copolymer, based on the combined weight of the hydroxybenzene compound, the aldehyde compound, and the additive.

9. The process of claim 1, wherein at least a portion of the hydroxybenzene compound and at least a portion of the aldehyde compound are reacted with one another to form a prepolymer, and wherein the prepolymer is reacted with the additive to produce the wet gel.

10. The process of claim 1, further comprising combining at least one polyol with the hydroxybenzene compound, the aldehyde compound, and the additive to produce the reaction mixture, wherein the reaction mixture comprises about 0.1 wt % to about 40 wt % of the polyol, based on the combined weight of the hydroxybenzene compound, the aldehyde compound, the additive, and the polyol, and wherein the polyol comprises diethanolamine, triethanolamine, ethyl diethanolamine, methyl diethanolamine, or a mixture thereof.

11. The process of claim 1, further comprising combining at least one modifier with the hydroxybenzene compound, the aldehyde compound, and the additive to produce the reaction mixture, wherein the reaction mixture comprises about 0.1 wt % to about 95 wt % of the modifier, based on the combined weight of the hydroxybenzene compound, the aldehyde compound, the additive, and the modifier, and wherein the modifier comprises lead, tin, antimony, bismuth, arsenic, tungsten, silver, zinc, cadmium, indium, silicon, iron, sulfur, cobalt, nickel, bromine, chlorine, ruthenium, rhodium, platinum, palladium, zirconium, gold, oxides thereof, or a mixture thereof.

12. The process of claim 1, wherein the hydroxybenzene compound comprises phenol, resorcinol, cresol, catechol, hydroquinone, phloroglucinol, or a mixture thereof, wherein the aldehyde compound comprises formaldehyde, acetaldehyde, propionaldehyde, butyraldehyde, furfuraldehyde, glucose, benzaldehyde, cinnamaldehyde, or a mixture thereof, and wherein the anhydride comprises maleic anhydride, phthalic anhydride, acetic anhydride, succinic anhydride, naphthalic anhydride, 1,2,4-benzenetricarboxylic anhydride, or a mixture thereof.

13. The process of claim 1, wherein the wet gel comprises a network of polymer chains having one or more pores that are at least partially filled by a liquid.

14. The process of claim 1, wherein the wet gel comprises a network of polymer chains having one or more pores that are filled by a liquid.

15. The process of claim 1, wherein the wet gel is a hydrogel comprising a network of polymer chains having one or more pores that are at least partially filled by water.

16. A process for making a wet gel, comprising:
mixing a hydroxybenzene compound, an aldehyde compound, a solvent, and an additive to provide a reaction mixture;
reacting at least the hydroxybenzene compound and the aldehyde compound in the reaction mixture to produce a wet gel, wherein:
the additive comprises a carboxylic acid and an anhydride,
the reaction mixture comprises about 10 wt % to about 65 wt % of the hydroxybenzene compound, about 5 wt % to about 25 wt % of the aldehyde compound, about 25 wt % to about 75 wt % of the carboxylic acid, and about 0.5 wt % to about 10 wt % of the anhydride, based on the combined weight of the hydroxybenzene compound, the aldehyde compound, and the additive,
the reaction mixture comprises about 35 wt % to about 85 wt % of the additive, based on the combined weight of the hydroxybenzene compound, the aldehyde compound, and the additive, and
the reaction mixture comprises about 1 wt % to about 60 wt % of the solvent, based on the combined weight of the hydroxybenzene compound, the aldehyde compound, the solvent, and the additive.

17. The process of claim 16, wherein:
the hydroxybenzene compound comprises phenol, resorcinol, or a mixture thereof,
the aldehyde compound comprises formaldehyde,
the solvent comprises water,
the carboxylic acid comprises acetic acid, citric acid, or a mixture thereof,
the anhydride comprises maleic anhydride, succinic anhydride, or a mixture thereof,
the wet gel comprises a network of polymer chains having one or more pores that are at least partially filled by the solvent.

18. The process of claim 16, wherein at least a portion of the hydroxybenzene compound and at least a portion of the aldehyde compound are reacted with one another to form a prepolymer, and wherein the prepolymer is reacted in the presence of the additive or with the additive to produce the wet gel.

19. A wet gel produced by polymerizing a monomer component comprising at least a hydroxybenzene compound and an aldehyde compound, wherein the monomer component is polymerized in the presence of an additive comprising an anhydride, and wherein the hydroxybenzene compound is present in an amount of about 10 wt % to about 65 wt %, the aldehyde compound is present in an amount of about 5 wt % to about 25 wt %, and the anhydride is present in an amount of up to about 40 wt %, based on the combined weight of the hydroxybenzene compound, the aldehyde compound, and the additive.

20. The wet gel of claim 19, wherein:
the additive further comprises a carboxylic acid,
the carboxylic acid comprises acetic acid, citric acid, or a mixture thereof,
the hydroxybenzene compound comprises phenol, resorcinol, cresol, catechol, hydroquinone, phloroglucinol, or a mixture thereof,
the aldehyde compound comprises formaldehyde, acetaldehyde, propionaldehyde, butyraldehyde, furfuraldehyde, glucose, benzaldehyde, cinnamaldehyde, or a mixture thereof,
the anhydride comprises maleic anhydride, phthalic anhydride, acetic anhydride, succinic anhydride, naphthalic anhydride, 1,2,4-benzenetricarboxylic anhydride, or a mixture thereof,
the anhydride is present in an amount of about 0.1 wt % to about 10 wt %, the carboxylic acid is present in an amount of about 25 wt % to about 75 wt %, and the additive is present in an amount of about 35 wt % to about 85 wt %, based on the combined weight of the hydroxybenzene compound, the aldehyde compound, and the additive, and
the wet gel comprises a network of polymer chains having one or more pores that are at least partially filled by a liquid.

* * * * *